(12) United States Patent
Sato et al.

(10) Patent No.: US 12,066,710 B2
(45) Date of Patent: Aug. 20, 2024

(54) OPTICAL MEMBER AND LIQUID CRYSTAL DISPLAY DEVICE

(71) Applicants: TOPPAN INC., Tokyo (JP);
Tomoegawa Co., Ltd., Tokyo (JP)

(72) Inventors: Ayumu Sato, Tokyo (JP); Kunpei Kobayashi, Tokyo (JP); Norihiro Arai, Tokyo (JP); Kazuhiko Oosawa, Tokyo (JP); Hiroto Katagiri, Shizuoka (JP); Masahide Sugiyama, Shizuoka (JP); Masao Kato, Shizuoka (JP)

(73) Assignees: TOPPAN INC., Tokyo (JP); TOMOEGAWA CO., LTD., Tokyo (JP)

( * ) Notice: Subject to any disclaimer, the term of this patent is extended or adjusted under 35 U.S.C. 154(b) by 0 days.

(21) Appl. No.: 18/459,858

(22) Filed: Sep. 1, 2023

(65) Prior Publication Data
US 2023/0408861 A1 Dec. 21, 2023

Related U.S. Application Data

(63) Continuation of application No. PCT/JP2022/008916, filed on Mar. 2, 2022.

(30) Foreign Application Priority Data

Mar. 5, 2021 (JP) .................... 2021-035689

(51) Int. Cl.
*G02F 1/1335* (2006.01)

(52) U.S. Cl.
CPC .. *G02F 1/133536* (2013.01); *G02F 1/133504* (2013.01)

(58) Field of Classification Search
CPC ............ G02F 1/1336; G02F 1/1335; G02F 1/133504; G02F 1/133536; G02B 5/30; G02B 5/02
See application file for complete search history.

(56) References Cited

U.S. PATENT DOCUMENTS

| | | | |
|---|---|---|---|
| 7,154,672 B2 | 12/2006 | Harada | |
| 7,473,721 B2 | 1/2009 | Harada et al. | |
| 9,989,678 B2 | 6/2018 | Sakano et al. | |

(Continued)

FOREIGN PATENT DOCUMENTS

| | | |
|---|---|---|
| JP | 2002-107725 | 4/2002 |
| JP | 2004-093715 | 3/2004 |

(Continued)

OTHER PUBLICATIONS

International Search Report issued in International Application No. PCT/JP2022/008916 dated May 10, 2022.

(Continued)

*Primary Examiner* — Mariam Qureshi
(74) *Attorney, Agent, or Firm* — STAAS & HALSEY LLP

(57) ABSTRACT

An optical member including a polarizing plate having an absorption axis and a transmission axis which are orthogonal to each other, a reflective polarizing plate having a reflection axis and a transmission axis which are orthogonal to each other, and an optical anisotropic diffusion layer which is provided between the polarizing plate and the reflective polarizing plate and whose linear transmittance varies according to an incident light angle.

12 Claims, 14 Drawing Sheets

(56) References Cited

U.S. PATENT DOCUMENTS

| | | |
|---|---|---|
| 2004/0085640 A1 | 5/2004 | Harada |
| 2005/0101698 A1 | 5/2005 | Harada et al. |
| 2007/0195233 A1 | 8/2007 | Hasegawa et al. |
| 2016/0217750 A1* | 7/2016 | Lee .......................... G06F 3/005 |
| 2017/0192137 A1 | 7/2017 | Sakano et al. |
| 2019/0204488 A1* | 7/2019 | Sakano ................. G02F 1/1335 |

FOREIGN PATENT DOCUMENTS

| | | |
|---|---|---|
| JP | 2005-514487 | 5/2005 |
| JP | 2005-265915 | 9/2005 |
| JP | 2005-292219 | 10/2005 |
| JP | 2007-249182 | 9/2007 |
| JP | 2012-181377 | 9/2012 |
| JP | 2015-191178 | 11/2015 |
| JP | 2020-112729 | 7/2020 |
| WO | WO 02/086562 A1 | 10/2002 |

OTHER PUBLICATIONS

Written Opinion issued in International Application No. PCT/JP2022/008916 dated May 10, 2022.
English Translation of IPRP (PCT/IB/338 and PCT/IB/373) (Sep. 14, 2023 and Aug. 29, 2023) and the Written Opinion of ISA (PCT/ISA/237) issued in International Application No. PCT/JP2022/008916 dated May 10, 2022 (5 pages).

* cited by examiner

|  | Scattering central axis angle | Scattering central axis angle + incident light angle | k |
|---|---|---|---|
| Condition 1 | 8° | −6° | 0.39 |
| Condition 2 | 14° | 0° | 0.36 |
| Condition 3 | 15° | 1° | 0.41 |
| Condition 4 | 17° | 3° | 0.38 |
| Condition 5 | 21° | 7° | 0.34 |

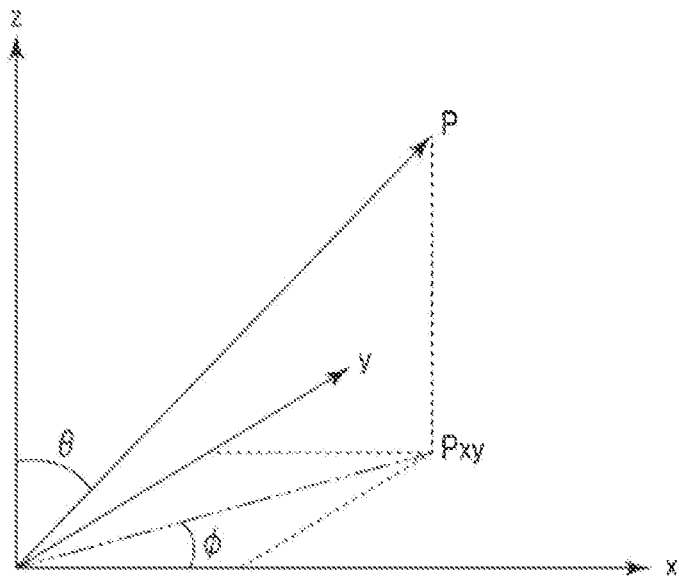
F I G. 23
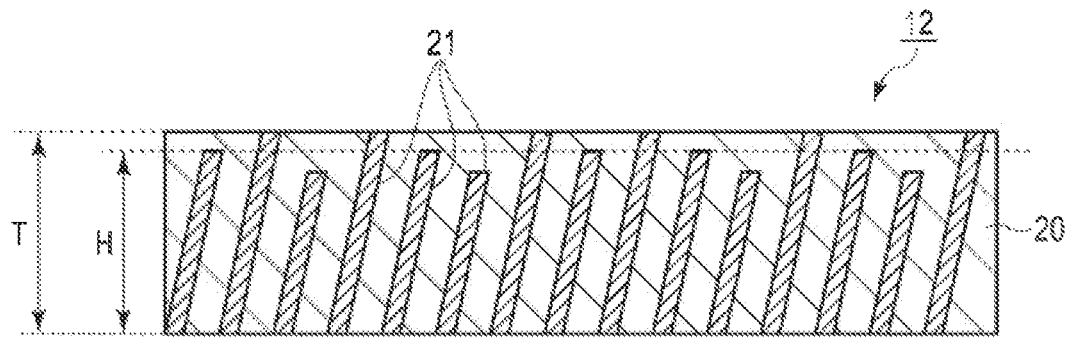
F I G. 24

OPTICAL MEMBER AND LIQUID CRYSTAL DISPLAY DEVICE

CROSS-REFERENCE TO RELATED APPLICATIONS

This application is a Continuation application of PCT Application No. PCT/JP2022/008916, filed Mar. 2, 2022, and based upon and claiming the benefit of priority from Japanese Patent Application No. 2021-035689, filed Mar. 5, 2021, the entire contents of all of which are incorporated herein by reference.

FIELD

The present invention relates generally to an optical member and a liquid crystal display device.

BACKGROUND

As a liquid crystal display device that has improved in its sunlight visibility, a transmissive/reflective liquid crystal display device is known in which an image can be displayed as both transmission display using illumination light from a lighting device placed on the opposite side of the observation side and reflection display using external light incident from the observation side. As the transmissive/reflective liquid crystal display device, there are two types: one in which a lighting device is placed on the opposite side of the observation side of a liquid crystal display element, a plurality of pixels of the liquid crystal display element are each divided into two areas, and a reflective film is provided on the rear side of a liquid crystal layer of one of the areas, thereby forming a reflective display unit and a transmissive display unit for each of the pixels (patent literature 1: Jpn. Pat. Appln. KOKAI Publication No. 2004-93715); and the other in which a lighting device is placed on the opposite side of the observation side of a liquid crystal display element and a semi-transmissive reflective film is placed on the rear side (lighting device side) of a liquid crystal layer of the liquid crystal display element (patent literature 2: Jpn. Pat. Appln. KOKAI Publication No. 2002-107725).

In both of the above types, however, a conventional transmissive/reflective liquid crystal display device has the problem that its reflection display is dark. To solve this problem, a method of brightening reflection display by introducing an optical anisotropic diffusion layer and a reflective polarizing film between a liquid crystal display element and a lighting device, is proposed (patent literature 3: International Publication No. 02/086562). Another method of brightening reflection display by introducing another reflective polarizing film to prevent transmission display from being darkened (patent literature 4: Jpn. Pat. Appln. KOKAI Publication No. 2020-112729).

However, the transmissive/reflective liquid crystal display devices of patent literatures 3 and 4 have the problem that transmission display is darkened if the scattering property of an anisotropic diffusion layer is increased in order to brighten the reflection display of the transmissive/reflective liquid crystal display device.

SUMMARY

According to a first aspect of the present invention, there is provided an optical member comprising a first polarizing plate having an absorption axis and a transmission axis which are orthogonal to each other, a reflective polarizing plate having a reflection axis and a transmission axis which are orthogonal to each other, and an optical anisotropic diffusion layer which is provided between the first polarizing plate and the reflective polarizing plate and whose linear transmittance varies according to an incident light angle. The optical anisotropic diffusion layer has a scattering central axis that is an axis of symmetry regarding light diffusivity. If a scattering central axis angle, which is an angle formed by a normal of the optical anisotropic diffusion layer and the scattering central axis, is $\theta$ ($0<\theta<90°$), an incident light angle at which the linear transmittance becomes maximum on a side opposite to the scattering central axis angle $\theta$ with respect to the normal of the optical anisotropic diffusion layer in a plane including the normal of the optical anisotropic diffusion layer and the scattering central axis, is $\alpha$ ($-90°<\alpha<0°$), and an incident light angle at which the linear transmittance becomes minimum between the scattering central axis angle $\theta$ and the angle $\alpha$ is $\beta$ ($\alpha<\beta<\theta$), a value k of the optical anisotropic diffusion layer is expressed as follows:

$k$=(linear transmittance at scattering central axis angle $\theta$-linear transmittance at angle $\beta$)/linear transmittance at angle $\alpha$, wherein k is 0.18 or more.

According to a second aspect of the present invention, there is provided the optical member of the first aspect, wherein the linear transmittance at the angle $\alpha$ is 20% or more.

According to a third aspect of the present invention, there is provided the optical member of the first aspect, wherein the scattering central axis angle $\theta$ is more than 0° and equal to or less than 30°.

According to a fourth aspect of the present invention, there is provided the optical member of the first aspect, wherein the optical anisotropic diffusion layer includes a matrix region, and a plurality of pillar regions provided in the matrix region, and the plurality of pillar regions extend in a thickness direction of the matrix region, and have a refractive index that differs from a refractive index of the matrix region.

According to a fifth aspect of the present invention, there is provided the optical member of the first aspect, wherein the reflection axis of the reflective polarizing plate is set parallel to the absorption axis of the first polarizing plate.

According to a sixth aspect of the present invention, there is provided a liquid crystal display device comprising the optical member of the first aspect, a liquid crystal panel including a liquid crystal layer, and a second polarizing plate having an absorption axis and a transmission axis which are orthogonal to each other, wherein the first polarizing plate and the second polarizing plate are arranged to sandwich the liquid crystal panel.

According to a seventh aspect of the present invention, there is provided the liquid crystal display device of the sixth aspect, wherein the absorption axis of the second polarizing plate is orthogonal to the absorption axis of the first polarizing plate.

According to an eighth aspect of the present invention, there is provided the liquid crystal display device of the sixth aspect, further comprising an illuminating device placed opposite to the liquid crystal panel of the optical member to emit illuminating light toward the liquid crystal panel.

BRIEF DESCRIPTION OF THE DRAWINGS

FIG. 23 is a diagram showing a three-dimensional polar coordinate expression to illustrate the scattering central axis.

FIG. 24 is a schematic sectional view showing an example of the optical anisotropic diffusion layer.

DETAILED DESCRIPTION

Figure 1:
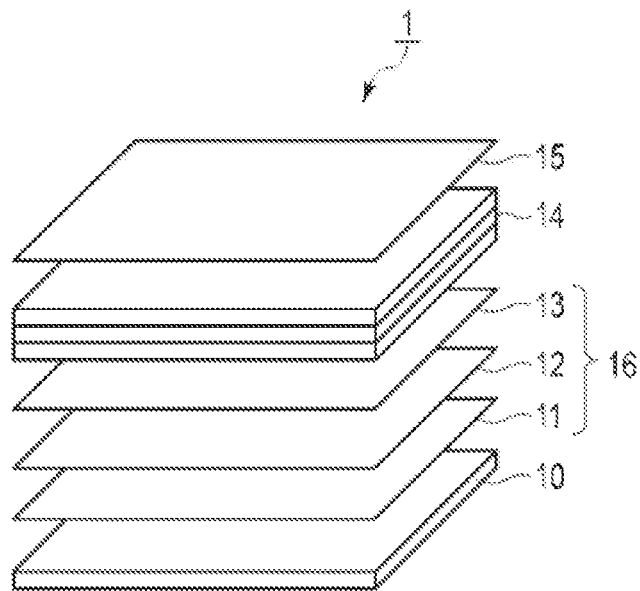
FIG. 1 is a perspective view showing a schematic configuration of a liquid crystal display device according to an embodiment of the present invention.

Embodiments will be described below with reference to the drawings. The drawings are schematic or conceptual, and the dimension, ratio, etc. in each of the drawings are not necessarily the same as the actual ones. The drawings may include components that differ in the relationship in dimensions and in the ratio even though the components are the same. Some of the embodiments exemplify a device and a method for embodying the technical concept of the present invention, and the technical concept is not specified by the shape, configuration, placement, etc. of the components. In the following descriptions, the elements having the same function and configuration are denoted by the same sign and their descriptions will be repeated only when necessary.

<1> Descriptions of Terms

The main terms used in the specification and the claims are as follows.

(1) Optical Anisotropic Diffusion Layer

An optical anisotropic diffusion layer is a light diffusion layer (light diffusion film) whose light diffusivity varies with the incident angle of incident light (incident light angle). That is, it is a light diffusion layer whose linear transmittance varies with the incident light angle and whose light diffusivity depends upon the incident light angle.

(2) Linear Transmittance

The linear transmittance is a ratio between the amount of light transmitted in the linear direction (linearly transmitted light amount) and the amount of incident light (incident light amount) when light enters the optical anisotropic diffusion layer at a certain incident light angle. The linear direction indicates a direction in which incident light travels. The linear transmittance is given by the following equation:

Linear transmittance(%)=(Linearly transmitted light amount/incident light amount)×100

(3) Maximum Linear Transmittance and Minimum Linear Transmittance

The maximum linear transmittance is linear transmittance of light incident at an incident light angle at which the linear transmittance becomes maximum. The minimum linear transmittance is linear transmittance of light incident at an incident light angle at which the linear transmittance becomes minimum.

(4) Scattering Central Axis

The scattering central axis is an axis of symmetry regarding the light diffusivity of the optical anisotropic diffusion layer. Specifically, the scattering central axis represents a direction corresponding to the incident light angle with respect to which the light diffusivity of the optical anisotropic diffusion layer has an approximately symmetric property, assuming that the incident light angle for the optical anisotropic diffusion layer was varied. The reason for using the wording "having an approximately symmetric property" is that if the scattering central axis has an inclination to the normal of the optical anisotropic diffusion layer, the optical property ("optical profile" to be described later) strictly has no symmetric property. The scattering central axis can be confirmed by the incident light angle having an approximately symmetry property in the optical profile.

(5) Scattering Central Axis Angle

The angle (polar angle) θ (−90°<θ<90°) between the normal of the optical anisotropic diffusion layer and the scattering central axis is defined as a scattering central axis angle. If the scattering central axis is on the positive side of the normal of the optical anisotropic diffusion layer, the angle θ is given by 0°<θ<90°. If the scattering central axis is on the negative side of the normal of the optical anisotropic diffusion layer, the angle θ is given by −90°<θ<0.

(6) Scattering and Diffusion

In the present specification, "scattering" and "diffusion" have the same meaning.

<2> Schematic Configuration of Liquid Crystal Display Device

FIG. 1 is a perspective view showing a schematic configuration of a liquid crystal display device 1 according to an embodiment of the present invention. The liquid crystal display device 1 includes a lighting device 10, a reflective polarizing plate 11, an optical anisotropic diffusion layer 12, a polarizing plate 13, a liquid crystal panel 14 and a polarizing plate 15, which arranged in order from the bottom (from the opposite side of the observation side). The lighting device 10 is also referred to as a backlight. The reflective polarizing plate 11, optical anisotropic diffusion layer 12 and polarizing plate 13 constitute an optical member 16.

The lighting device 10 constitutes a surface light source. The lighting device 10 is placed opposite to the observation side of the liquid crystal panel 14 to emit illumination light toward the liquid crystal panel 14. In addition, the lighting device 10 reflects light, which has entered from the observation side and passed through the liquid crystal panel 14, toward the liquid crystal panel 14.

The reflective polarizing plate 11 has a reflection axis and a transmission axis which are perpendicular to each other. The reflective polarizing plate 11 reflects linearly polarized light having a light vibration plane parallel to the reflection axis and transmits linearly polarized light having a light vibration plane parallel to the transmission axis.

The optical anisotropic diffusion layer 12 is a light diffusion layer (light diffusion film) whose light diffusivity varies with the incident light angle. That is, the optical anisotropic diffusion layer 12 is a light diffusion layer whose linear transmittance varies with the incident light angle and whose light diffusivity depends upon the incident light angle.

The polarizing plate 13 has an absorption axis and a transmission axis which are orthogonal to each other. The polarizing plate 13 is an absorption polarizing plate which transmits linearly polarized light having a light vibration plane parallel to the transmission axis and absorbs linearly polarized light having a light vibration plane parallel to the absorption axis. The absorption axis of the polarizing plate 13 is set parallel to the reflection axis of the reflection polarizing plate 11.

The liquid crystal panel 14 includes a liquid crystal layer interposed between paired substrates. The liquid crystal panel 14 receives illumination light emitted from the lighting device 10 and also receives light reflected by the reflective polarizing plate 11. The liquid crystal panel 14 transmits and modulates light that has entered from the lighting device 10.

The polarizing plate 15 has an absorption axis and a transmission axis which are orthogonal to each other. The polarizing plate 15 is an absorption polarizing plate which transmits linearly polarized light having a light vibration plane parallel to the transmission axis and absorbs linearly polarized light having a light vibration plane parallel to the absorption axis. The absorption axis of the polarizing plate 15 is set to be orthogonal to the absorption axis of the polarizing plate 13.

The transmission display is made as follows. Light emitted from the lighting device 10 enters the reflective polarizing plate 11, and linearly polarized light parallel to the transmission axis of the reflective polarizing plate 11 is transmitted through the reflective polarizing plate 11. The light transmitted through the reflecting polarizing plate 11 is transmitted through the optical anisotropic diffusion layer 12 and further through the polarizing plate 13 having a transmission axis parallel to the transmission axis of the reflective polarizing plate 11. The light transmitted through the polarizing plate 13 is observed by an observer through the liquid crystal panel 14 and polarizing plate 15.

The reflection display is made as follows. Light from the observation side (external light) is transmitted through the polarizing plate 15, liquid crystal panel 14 and polarizing plate 13, and then part of the light is reflected by the optical anisotropic diffusion layer 12. The light reflected by the optical anisotropic diffusion layer 12 is observed by an observer through the polarizing plate 13, liquid crystal panel 14 and polarizing plate 15. The part of light transmitted through the optical anisotropic diffusion layer 12 is reflected by the lighting device 10. The light reflected by the lighting device 10 follows the same path as the transmission display described above and is observed by the observer.

<3> Optical Profile of Optical Anisotropic Diffusion Layer 12

Figure 2:
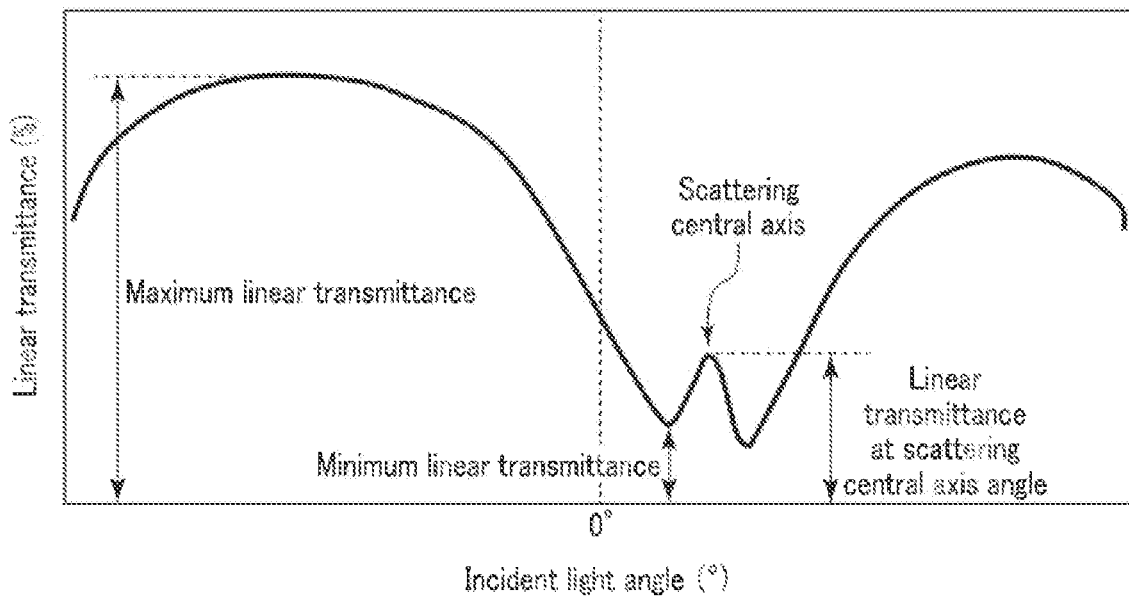
FIG. 2 is a diagram illustrating an optical profile of an optical anisotropic diffusion layer.

FIG. 2 is a diagram illustrating an optical profile of the optical anisotropic diffusion layer 12. In FIG. 2, the horizontal axis represents the incident light angle (degree (°)), and the vertical axis represents the linear transmittance (%). In FIG. 2, angle 0° is the normal of the optical anisotropic diffusion layer 12, and the left side of angle 0° is the negative direction and the right side thereof is the positive direction. In the present specification, a curve showing the incident light angle dependence of light diffusivity is referred to as an "optical profile." Although the optical profile does not directly express the light diffusivity, it can be said that the optical profile generally indicates the light diffusivity if it is interpreted that as the linear transmittance increases, the diffuse transmittance increases to the contrary.

As shown in FIG. 2, the optical anisotropic diffusion layer 12 varies in its linear transmittance with the incident light angle. The optical anisotropic diffusion layer 12 has incident light angle dependence of light diffusivity in which the linear transmittance varies with the angle of light incident upon the optical anisotropic diffusion layer 12. The optical profile of the optical anisotropic diffusion layer 12 has three peaks and two valleys. The scattering central axis represents a direction that coincides with the incident light angle corresponding to the central peak. The optical profile of the optical anisotropic diffusion layer 12 is symmetrical with regard to the scattering central axis.

Assume that the scattering central axis angle, which is an angle between the normal of the optical anisotropic diffusion layer 12 and the scattering central axis, is θ (0<θ<90°). Assume that in the plane including the normal of the optical anisotropic diffusion layer 12 and the scattering central axis, the incident light angle at which the linear transmittance becomes maximum on a side opposite to the scattering central axis angle θ with respect to the normal of the optical anisotropic diffusion layer is α (−90°<α<0°). Assume that between the scattering central axis angle θ and the angle α, the incident light angle at which the linear transmittance becomes minimum is β (α<β<θ).

The value k inherent in the optical anisotropic diffusion layer 12 is expressed by the following equation 1:

$$k = (\text{linear transmittance at scattering central axis angle } \theta - \text{linear transmittance at angle } \beta)/\text{linear transmittance at angle } \alpha \quad (1)$$

The linear transmittance at angle β is the minimum linear transmittance. The linear transmittance at angle α is the maximum linear transmittance. Thus, equation 1 is also represented by equation 2.

$$k = (\text{linear transmittance at scattering central axis angle} - \text{minimum linear transmittance}) / \text{maximum linear transmittance} \quad (2)$$

Assume in the example of FIG. 2 that the maximum linear transmittance in a region where the incident light angle is negative is the maximum linear transmittance, and the linear transmittance in the left one of two valleys following the maximum linear transmittance is the minimum linear transmittance. In the present embodiment, value k is set to be greater than or equal to 0.18 and less than or equal to 1. The conditions for the range of value k will be described below. Using the optical anisotropic diffusion layer 12 that satisfies the conditions in a liquid crystal display device, the reflection display can be brightened while maintaining the transmission display.

<4> Example of Liquid Crystal Display Device 1

Next is a description of an example of the liquid crystal display device 1 including an optical anisotropic diffusion layer 12.

Figure 3:
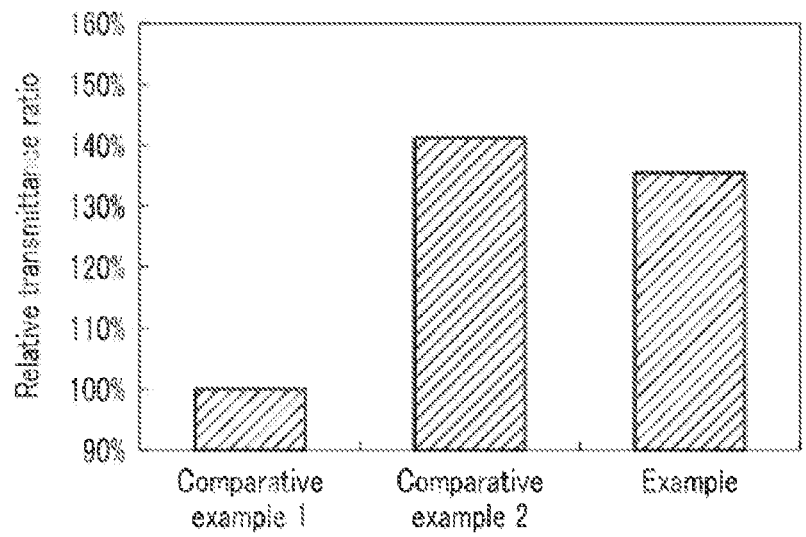
FIG. 3 is a graph illustrating a relative transmittance ratio of the liquid crystal display device.
Figure 4:
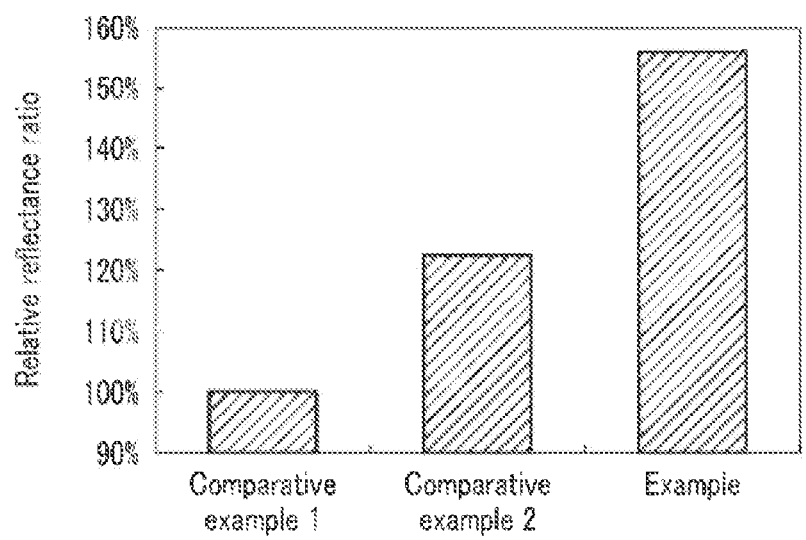
FIG. 4 is a graph illustrating a relative reflectance ratio of the liquid crystal display device.

FIG. 3 is a graph illustrating the relative transmittance ratio of the liquid crystal display device. FIG. 4 is a graph illustrating the relative reflectance ratio of the liquid crystal display device. The graphs of FIGS. 3 and 4 each contain the example, comparative example 1 and comparative example 2.

The example is directed to the liquid crystal display device shown in FIG. 1 and including the optical anisotropic diffusion layer 12, and is directed to a fringe field switching (FFS) liquid crystal panel that is a transverse electric field system. Comparative example 1 is a liquid crystal display device including only two polarizing plates. Comparative example 2 is a liquid crystal display device including only two polarizing plates and a reflective polarizing plate. FIGS. 3 and 4 each show a relative ratio in the case where the ratio of comparative example 1 is 100%.

It can be seen from FIG. 3 that in the example, the transmission characteristic is kept equal to that of comparative example 2. It can be seen from FIG. 4 that the example is improved in reflection characteristic as compared with comparative examples 1 and 2.

Figure 5:
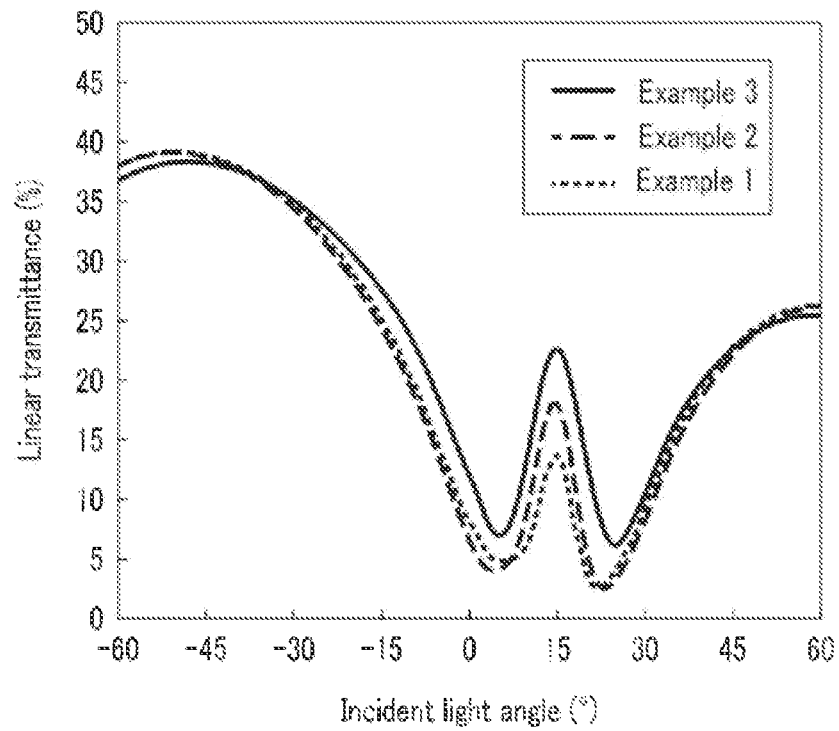
FIG. 5 is a graph illustrating an optical profile of an optical anisotropic diffusion layer in examples 1 to 3.
Figure 6:
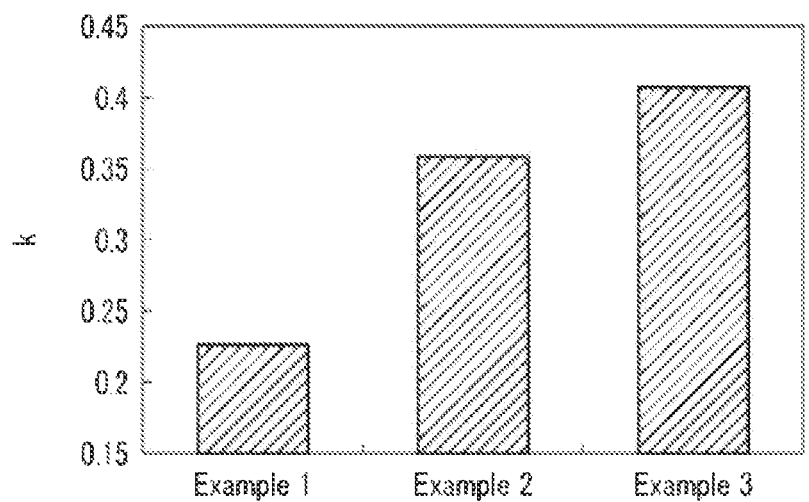
FIG. 6 is a graph illustrating a value k of the optical anisotropic diffusion layer in examples 1 to 3.
Figure 7:
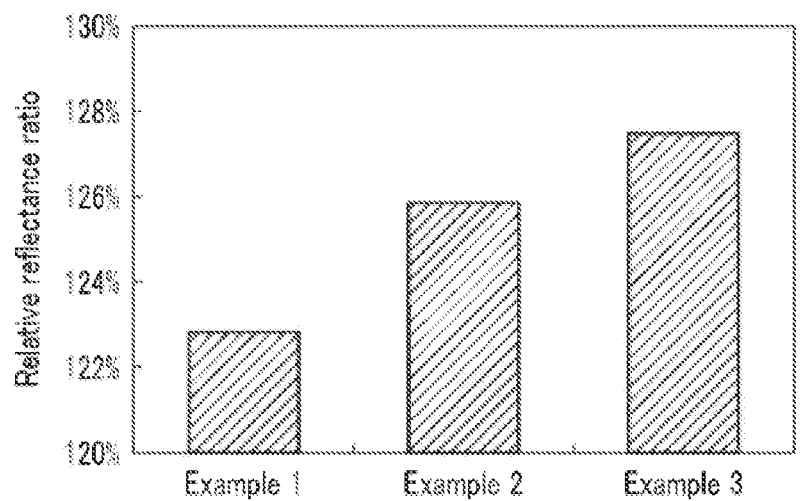
FIG. 7 is a graph illustrating a relative reflectance ratio of the liquid crystal display device in examples 1 to 3.

FIG. 5 is a graph illustrating an optical profile of the optical anisotropic diffusion layer 12 in examples 1 to 3. FIG. 6 is a diagram illustrating the value k of the optical anisotropic diffusion layer 12 in examples 1 to 3. FIG. 7 is a diagram illustrating the relative reflectance ratio of the liquid crystal display device in examples 1 to 3.

As shown in FIG. 5, the linear transmittance becomes a first maximum around the incident light angle of −50°, it becomes a first minimum around the incident light angle of 5°, and it becomes a second maximum around the incident light angle of 15°. As the linear transmittance moves further to the plus side, it becomes a second minimum around the incident light angle of 25° and becomes a third maximum around the incident light angle of 60°. In the example of FIG. 5, the incident light angle of 15° corresponds to the scattering central axis angle. Thus, the optical anisotropic diffusion layer 12 has properties that light is strongly scattered around the incident light angle of 5° and around the incident light angle of 25°, while its diffusion weakens and its linear transmittance increases in the other incident light angle ranges.

It is seen from FIGS. 5 to 7 that as the value k of the optical anisotropic diffusion layer 12 increases, the reflectance of the liquid crystal display becomes high.

Figure 8:
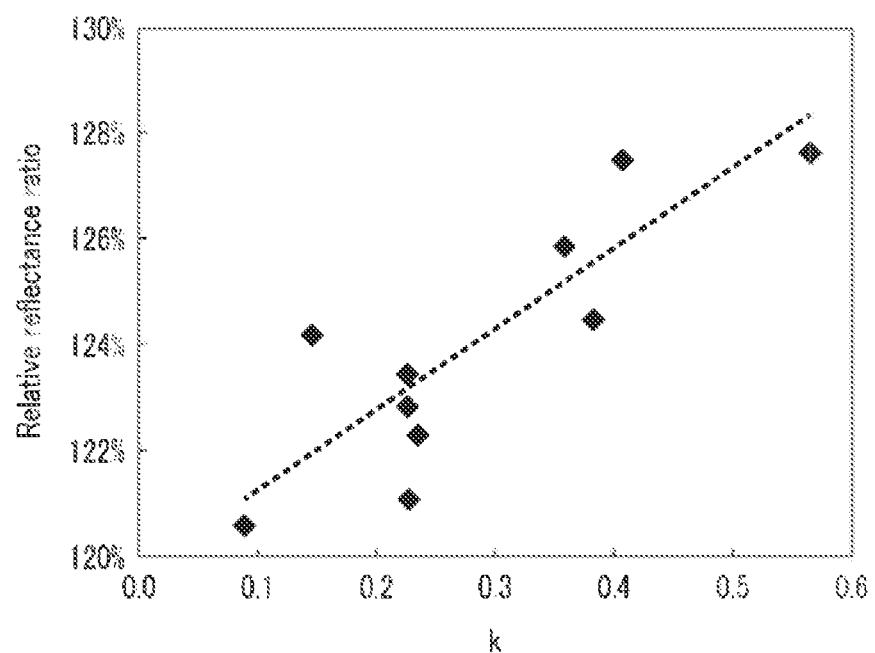
FIG. 8 is a graph illustrating the relationship between the value k of the optical anisotropic diffusion layer and the reflectance of the liquid crystal display.

FIG. 8 is a graph illustrating the relationship between the value k of the optical anisotropic diffusion layer 12 and the reflectance of the liquid crystal display. In FIG. 8, the horizontal axis represents the value k and the vertical axis represents the relative reflectance ratio. The relative reflectance ratio illustrated in FIG. 8 is a relative ratio in the case where the reflectance of comparative example 2 (a liquid crystal display device including only two polarizing plates and a reflective polarizing plate) is 100%.

It is seen from FIG. 8 that there is a proportional relationship between the value k of the optical anisotropic diffusion layer 12 and the reflectance of the liquid crystal display. It is also seen that as the value k of the optical anisotropic diffusion layer 12 increases, the reflectance of the liquid crystal display becomes high.

Figure 9:
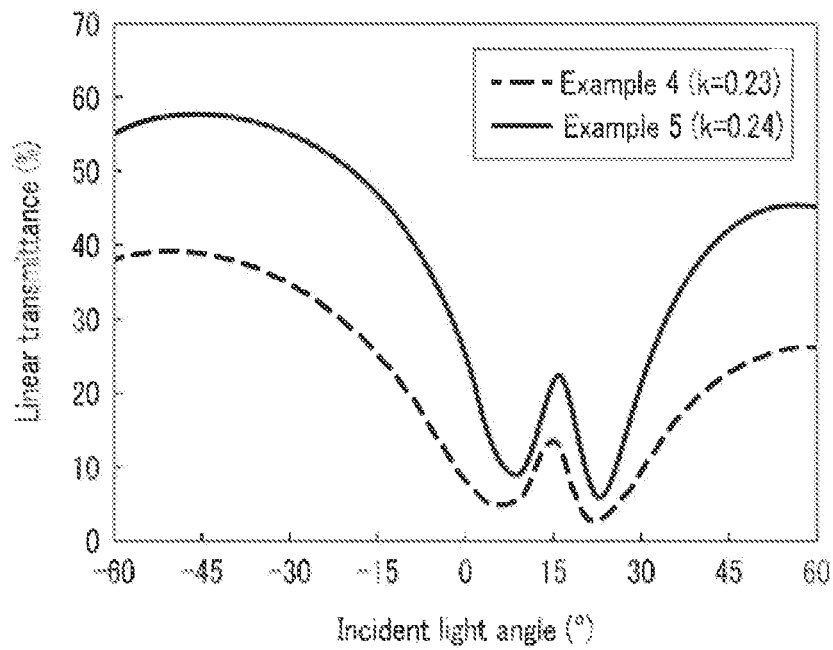
FIG. 9 is a graph illustrating an optical profile of the optical anisotropic diffusion layer in each of examples 4 and 5.
Figure 10:
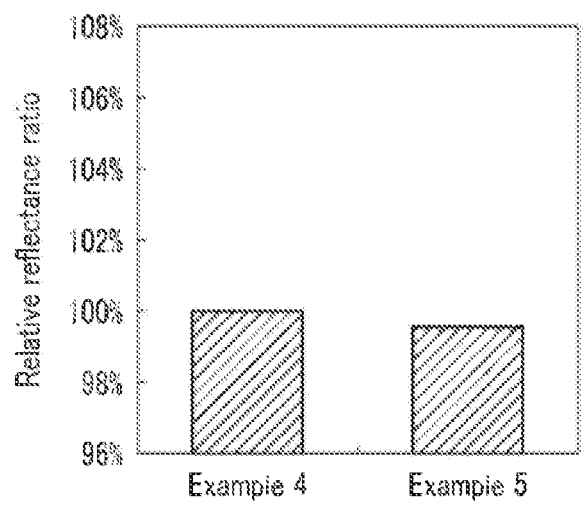
FIG. 10 is a graph illustrating a relative reflectance ratio of the liquid crystal display device in each of examples 4 and 5.
Figure 11:
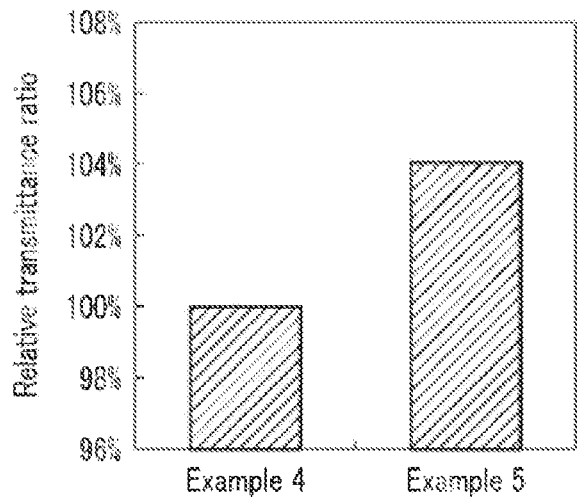
FIG. 11 is a graph illustrating a relative transmittance ratio of the liquid crystal display device in each of examples 4 and 5.

FIG. 9 is a graph illustrating an optical profile of the optical anisotropic diffusion layer 12 in each of examples 4 and 5. FIG. 10 is a graph illustrating a relative reflectance ratio of the liquid crystal display device in each of examples 4 and 5. FIG. 11 is a graph illustrating a relative transmittance ratio of the liquid crystal display device in each of examples 4 and 5. In example 4, k is equal to 0.23 and in example 5, k is equal to 0.24. FIGS. 10 and 11 each show a relative ratio in the case where the ratio in example 4 is 100%.

As is seen from FIGS. 9 to 11, if the numerical values of the scattering central axis angle and incident light angle are slightly adjusted while roughly maintaining the value k of the optical anisotropic diffusion layer 12, the transmittance of the liquid crystal display can be increased while maintaining the reflectance of the liquid crystal display.

Figure 12:
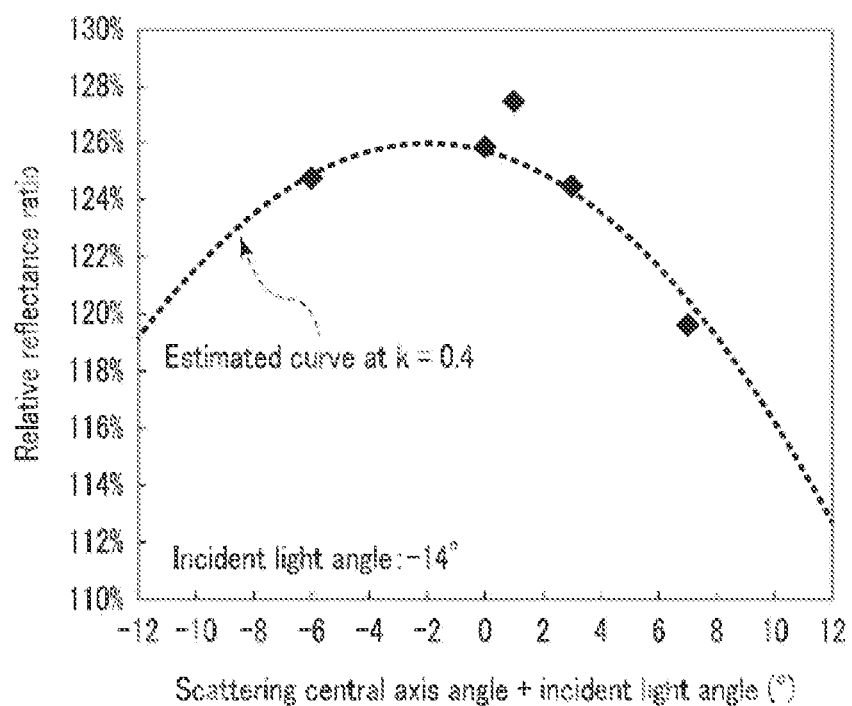
FIG. 12 is a graph illustrating the relationship between the relative reflectance ratio of the liquid crystal display device and the "scattering central axis angle+incident light angle".
Figures 13, 14:
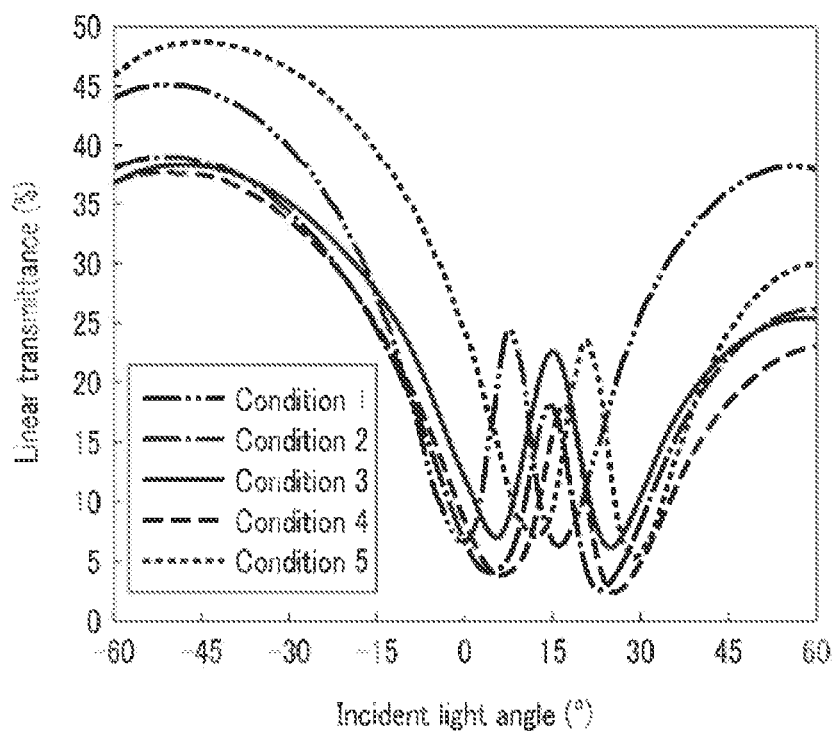
FIG. 13 is a table illustrating the conditions of points plotted in FIG. 12.
FIG. 14 is a graph illustrating an optical profile of the optical anisotropic diffusion layer 12 under conditions 1 to 5.

FIG. 12 is a graph illustrating the relationship between the relative reflectance ratio of the liquid crystal display device and the "scattering central axis angle+incident light angle." In FIG. 12, the horizontal axis represents the "scattering central axis angle+incident light angle" (°) and the vertical axis represents a relative reflectance ratio (%). The relative reflectance ratio in FIG. 12 is a relative ratio in the case where the reflectance of comparative example 2 (a liquid crystal display device having only two polarizing plates and a reflective polarizing plate) is 100%. FIG. 13 is a table illustrating the conditions of points plotted in FIG. 12. FIG. 14 is a graph illustrating an optical profile of the optical anisotropic diffusion layer 12 under conditions 1 to 5.

Under condition 1, the scattering central axis angle is equal to 8°, the "scattering central axis angle+incident light angle" is equal to −6°, and k is equal to 0.39. Under condition 2, the scattering central axis angle is equal to 14°, the "scattering central axis angle+incident light angle" is equal to 0, and k is equal to 0.36. Under condition 3, the scattering central axis angle is equal to 15, the "scattering central axis angle+incident light angle" is equal to 1°, and k is equal to 0.41. Under condition 4, the scattering central axis angle is equal to 17°, the "scattering central axis angle+incident light angle" is equal to 3°, and k is equal to 0.38. Under condition 5, the scattering central axis angle is equal to 21°, the "scattering central axis angle+incident light angle" is equal to 7°, and k is equal to 0.34.

In FIGS. 12 to 14, the incident light angle is −14°. The broken line in FIG. 12 indicates an estimated curve when k is equal to 0.4. It is seen from FIG. 12 that the reflection characteristics under conditions 2 and 3 are improved. That is, it is desirable to set the scattering central axis angle of the optical anisotropic diffusion layer at an angle at which light is regularly reflected with respect to the incident angle of external light in the reflection display.

<5> Optimum Design of Reflection Display

Figure 15:
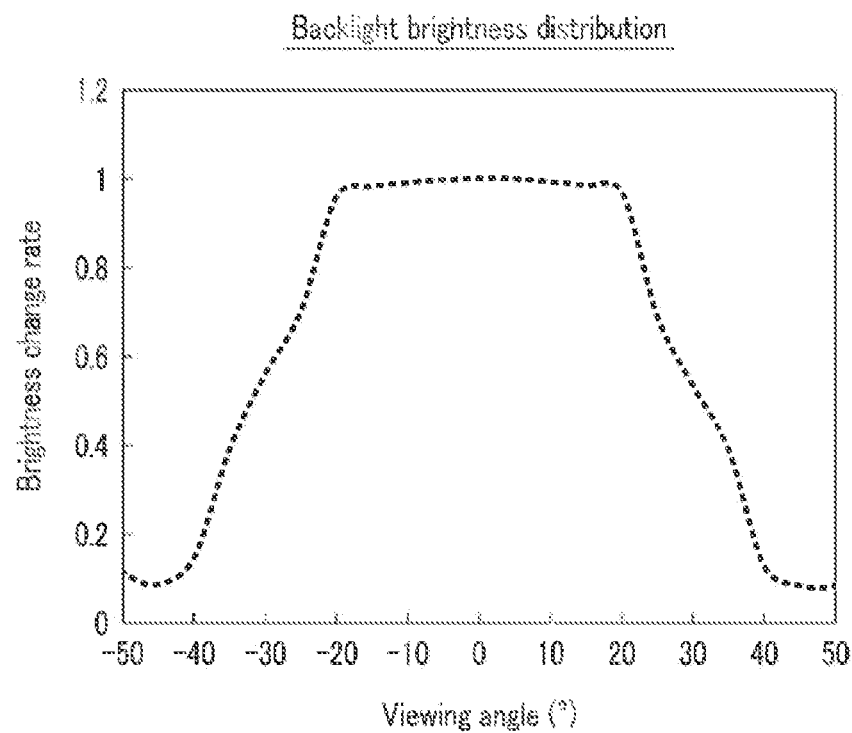
FIG. 15 is a graph illustrating the brightness distribution of a backlight.

FIG. 15 is a graph illustrating the brightness distribution of a backlight. In FIG. 15, the horizontal axis represents a viewing angle (°) and the vertical axis represents the brightness change rate. The example of FIG. 15 is directed to, for example, a backlight including two brightness enhancement films (BEF). The brightness enhancement films are each formed of, for example, a prism sheet, and has a function of improving the efficiency of using a light source in transmission display.

As shown in FIG. 15, generally, the backlight is so designed that its brightness is increased within a viewing angle range of ±20°. It is desirable that the liquid crystal display is so designed that its reflection display is also brightened within the viewing angle range.

Figure 16:
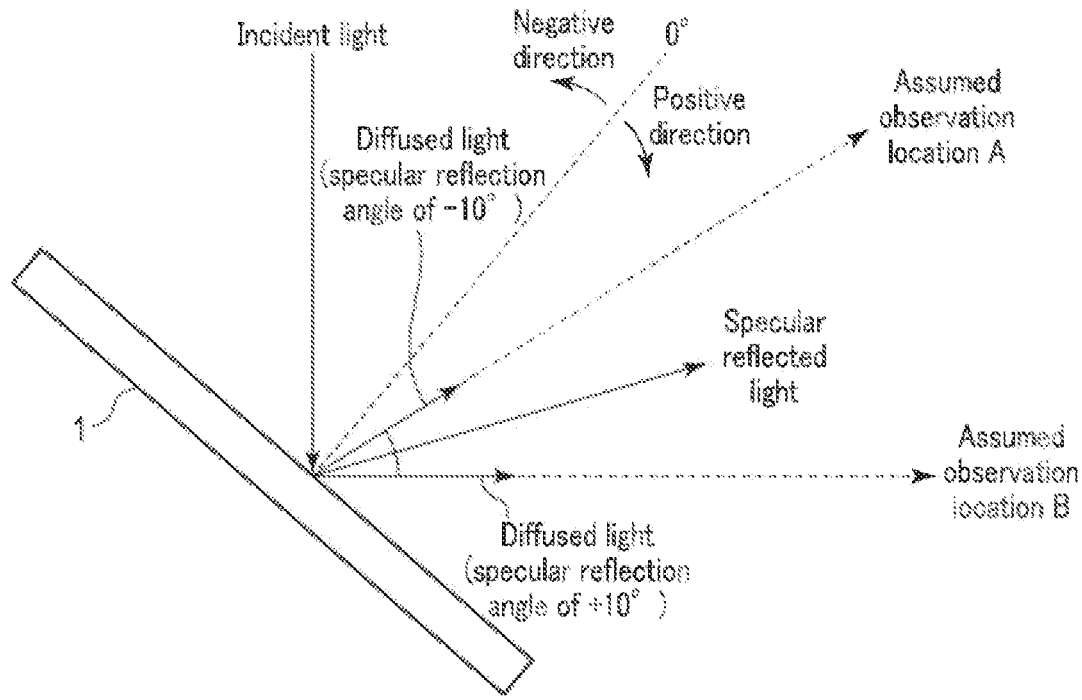
FIG. 16 is a diagram illustrating the optimum angle of reflection display with respect to an incident light angle.

FIG. 16 is a diagram illustrating the optimum angle of reflection display with respect to an incident light angle. The angle of the normal on the display surface of the liquid crystal display device 1 is 0°. The left side of the normal is in the negative direction and the right side thereof is in the positive direction. On the positive side of the normal of the liquid crystal display device 1, an observation location is set.

It is considered from experimental findings of the inventors that diffused light in the vicinity of ±10° of specular reflected light contributes to the reflection display. The diffused light of "specular reflection angle of −10°" is reflected toward the "assumed observation location A" in FIG. 16. The diffused light of "specular reflection angle of +10°" is reflected toward the "assumed observation location B" in FIG. 16. The specular reflection angle is an angle of specular reflected light with respect to the normal of the display surface of the liquid crystal display device 1.

Considering the range of satisfactory reflection display, it is desirable to assume incident light in the range of incident light angle of −30° or more to less than 0°. Furthermore, in order to increase the overlap between the brightness distribution of the backlight and the range of satisfactory reflection display, it is more desirable to assume the incident light in the range of incident light angle of −20° or more to less than 0°.

<6> Range of Value k of Optical Anisotropic Diffusion Layer 12

Figure 17:
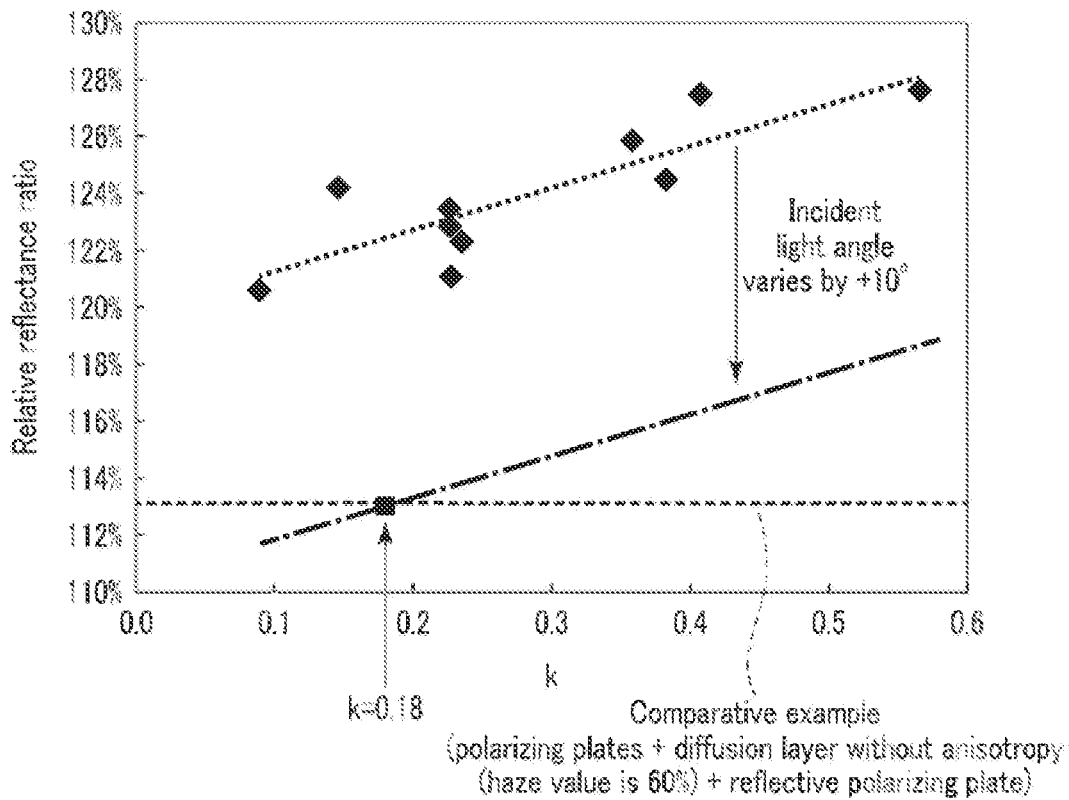
FIG. 17 is a graph illustrating the range of value k of the optical anisotropic diffusion layer.

FIG. 17 is a graph illustrating the range of value k of the optical anisotropic diffusion layer 12. In FIG. 17, the horizontal axis represents the value k and the vertical axis represents the relative reflectance ratio. The sloped broken line and points close to the line in FIG. 17 are the same as those in FIG. 8.

Assume that the angle of the normal on the display surface of the liquid crystal display is 0° and the incident light is in the range of incident light angle of −20° or more to less than 0°. Even if the incident light angle varies by ±10° (excluding the angle at which the observation location is close to the specular reflected light), it is necessary to obtain a higher advantageous effect than that when a general diffusion layer without anisotropy is introduced in order to obtain the advantageous effects of the present invention with stability.

The comparative example in FIG. 17 is directed to a liquid crystal display device including two polarizing plates, a general diffusion layer (haze value is 60%) without anisotropy, and a reflective polarizing plate. The relative reflectance ratio of the comparative example is approximately 113%. In the graph of FIG. 17, the alternate long and short dashed line indicates the relative reflectance ratio when the incident light angle varies by +100.

In order to improve the reflection characteristics of a liquid crystal display device with a diffusion layer without anisotropy whose haze value is 60%, which has almost the same transmittance as that of the present invention even though the incident light angle varies by +10°, it is necessary to set the value k at 0.18 or more. In addition, the variation on the side of the incident light angle of −10° is smaller than that on the side of +10°. If k is set equal to or larger than 0.18, the advantageous effects of the present invention can stably be obtained even though the incident light angle varies by ±10°.

<7> Range of Scattering Central Axis Angle

Figure 18:
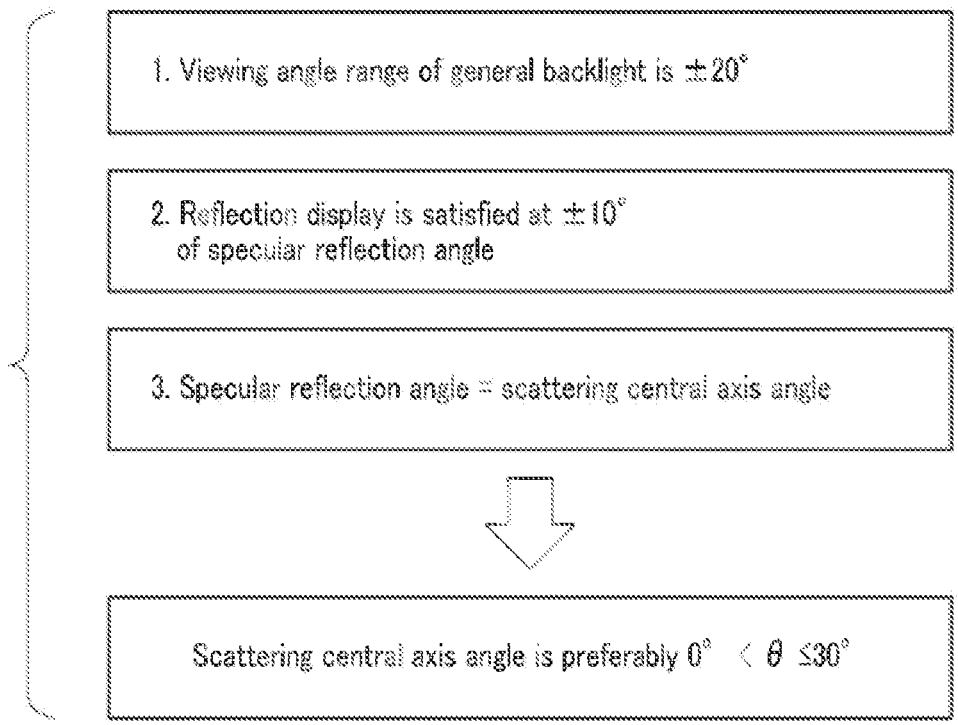
FIG. 18 is a diagram illustrating the range of the scattering central axis angle of the optical anisotropic diffusion layer.

FIG. 18 is a diagram illustrating the range of the scattering central axis angle of the optical anisotropic diffusion layer 12. The scattering central axis angle can be determined from the following three conditions:

(Condition 1) In the general backlight brightness distribution, the brightness increases within a viewing angle range of ±20° (see FIG. 15).

(Condition 2) The reflection display is satisfied at ±100 of the specular reflection angle to the incident light (see FIG. 16).

(Condition 3) The scattering central axis angle of the optical anisotropic diffusion layer is set to a specular reflection angle to the incident light (see FIG. 12).

It is seen from the above conditions 1 and 2 that it is desirable to assume the incident light in the range of incident light angle of −30° or more to less than 0° when the observation location is set at a positive angle with respect to the normal on the display surface of the liquid crystal display device. It is seen from condition 3 that it is desirable that the scattering central axis angle be similarly +30° or less because it is better to make the scattering central axis angle coincide with the specular reflection angle. It is thus desirable to fall the scattering central axis angle θ of the optical anisotropic diffusion layer 12 within the range of 0°<θ≤30°.

Since, furthermore, satisfactory reflection characteristics can be obtained if the scattering central axis angle is set on the negative side for incident light, it is more desirable to fall the scattering central axis angle θ of the optical anisotropic diffusion layer 12 within the range of 0°<θ≤20°.

<8> Configuration of Optical Anisotropic Diffusion Layer 12

The light diffusivity of the optical anisotropic diffusion layer 12 will be described more specifically with reference to FIGS. 19 to 22.

In the present embodiment, two structures (referred to as optical anisotropic diffusion layers 12A and 12B) will be described as the optical anisotropic diffusion layer 12. Here, the optical anisotropic diffusion layer 12A having a rod-shaped pillar region (also referred to as a pillar structure) is taken as an example, and will be described in contrast to the light diffusivity of the optical anisotropic diffusion layer 12B having a plate-like region (also referred to as a louver structure) instead of the pillar region. If the optical anisotropic diffusion layers 12A and 12B need not be particularly distinguished from each other, they will be referred to as the optical anisotropic diffusion layer 12.

Figure 19:
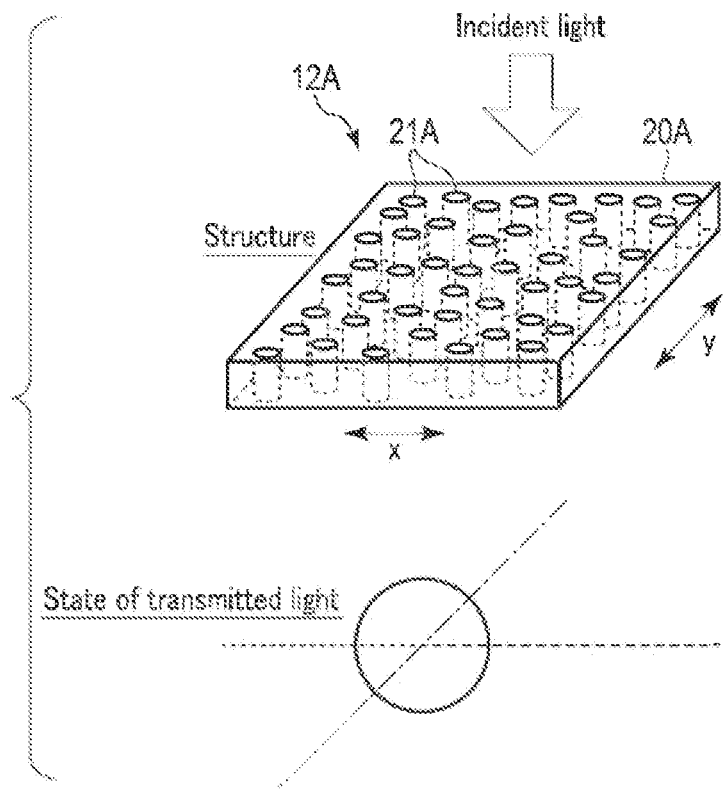
FIG. 19 is a schematic diagram showing a structure of the optical anisotropic diffusion layer and a state of transmitted light incident upon the optical anisotropic diffusion layer.
Figure 20:
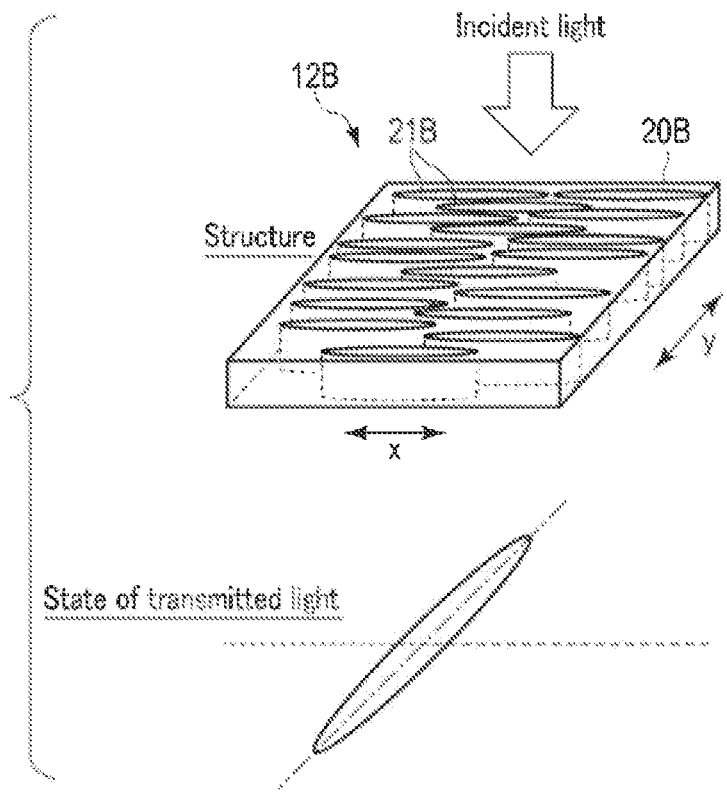
FIG. 20 is a schematic diagram showing a structure of the optical anisotropic diffusion layer and a state of transmission light incident upon the optical anisotropic diffusion layer.

FIG. 19 is a schematic diagram showing a structure of the optical anisotropic diffusion layer 12A and a state of transmitted light incident upon the optical anisotropic diffusion layer 12A. FIG. 20 is a schematic diagram showing a structure of the optical anisotropic diffusion layer 12B and a state of transmitted light incident upon the optical anisotropic diffusion layer 12B. In FIGS. 19 and 20, symbols 20A and 20B each denote a matrix region, symbol 21A denotes a pillar structure, and 21B denotes a louver structure.

Figure 21:
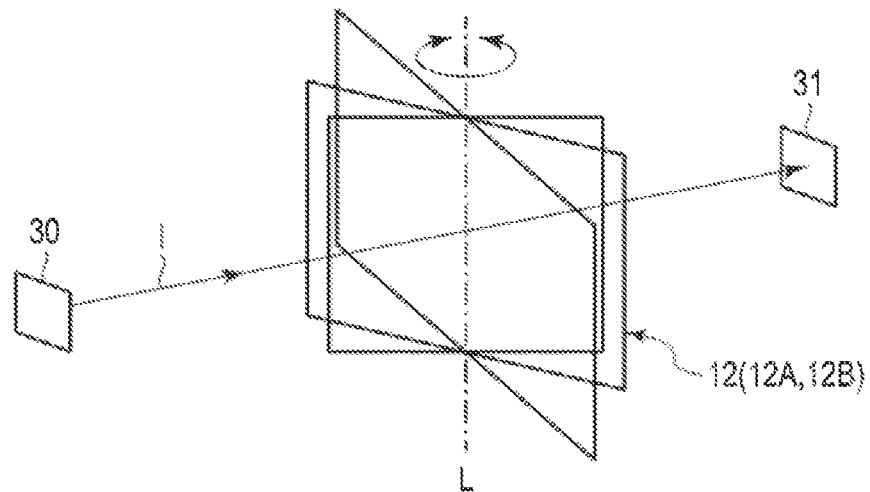
FIG. 21 is a diagram illustrating a method for evaluating the light diffusivity of an optical anisotropic diffusion layer.
Figure 22:
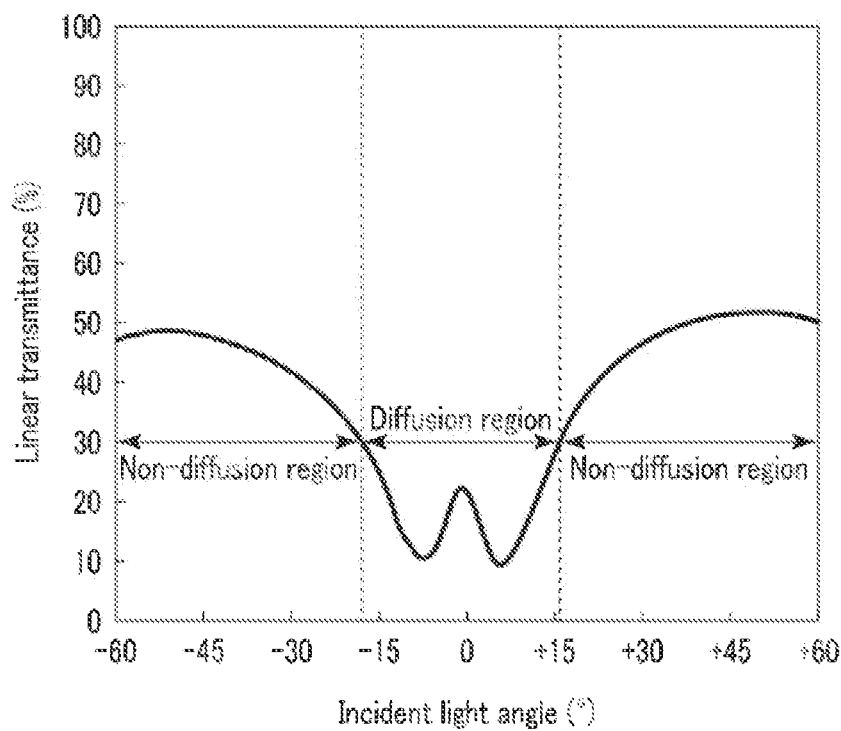
FIG. 22 is a graph illustrating an optical profile of the optical anisotropic diffusion layer shown in FIG. 21.

FIG. 21 is a diagram illustrating a method for evaluating the light diffusivity of the optical anisotropic diffusion layer 12 (12A, 12B). FIG. 22 is a graph illustrating an optical profile of the optical anisotropic diffusion layer 12 shown in FIG. 21.

The light diffusivity evaluation method is executed as follows. First, as shown in FIG. 21, a sample 12 of the optical anisotropic diffusion layer is placed between a light source 30 and a detector 31. Assume in the present embodiment that the incident light angle is set at 0° in the case where illumination light I is incident from the light source 30 in the normal direction of the sample 12. The sample 12 is so placed that it can be rotated optionally around a straight line L on the surface of the sample 12, and the light source 30 and detector 31 are fixed. That is, according to this method, the sample 12 can be placed between the light source 30 and the detector 31 to measure the amount of light which is linearly transmitted through the sample 12 and enters the detector 31 and determine the linear transmittance while varying the angle with the straight line L on the surface of the sample 12 as a central axis.

FIG. 22 shows a result of evaluating the light diffusivity of the optical anisotropic diffusion layer 12A when the x direction shown in FIG. 19 (a direction parallel to the long diameter of the pillar or plate-like region of the optical anisotropic diffusion layer or an optional direction if the long diameter is not uniquely determined such as that of a perfect circle) is chosen as the straight line L in the center of rotation shown in FIG. 21. That is, FIG. 22 is an optical profile showing the incident light angle dependence of the light diffusivity (light scattering property) of the optical anisotropic diffusion layer 12A, which is measured using the method shown in FIG. 21.

In FIG. 22, the vertical axis indicates the linear transmittance that is an index of the degree of scattering. In the present embodiment, when a predetermined number of parallel rays is incident, the linear transmittance indicates the ratio of the number of parallel rays emitted in the same direction as the incident direction and, more specifically, indicates the following: "linear transmittance=(amount of light detected by the detector 31 in the presence of the optical anisotropic diffusion layer 12A)/(amount of light detected by the detector 31 in the absence of the optical anisotropic diffusion layer 12A)×100." In FIG. 22, the horizontal axis indicates the angle of light incident upon the optical anisotropic diffusion layer 12A. Note that the positive and negative angles of incident light indicate that the directions in which the optical anisotropic diffusion layer 12A is rotated are opposite to each other.

When the direction of light incident upon the optical anisotropic diffusion layer at a predetermined incident light angle is substantially parallel to the alignment direction of the pillar or plate-like region (a direction in which the pillar or louver structure extends in its thickness direction), a higher priority is given to diffusion. When they are not parallel to each other, a higher priority is given to transmission. Therefore, the optical anisotropic diffusion layer has incident light angle dependence of diffusivity of light whose linear transmittance varies depending on the angle of light incident upon the optical anisotropic diffusion layer, as shown in FIG. 22, for example.

Normal isotropic light diffusion films exhibit a mountain-type optical profile with a peak around 0°. On the other hand, the optical anisotropic diffusion layer 12 exhibits a valley-type optical profile in which, when the incident light angle in a scattering central axis direction of the pillar structure 21A and louver structure 21B is 0°, the linear transmittance is minimized once at an incident light angle of ±5° to ±20°, as compared with the linear transmittance in the case of light incident at 0°, the linear transmittance increases as the incident light angle (the absolute value thereof) increases, and the linear transmittance is maximized at an incident light angle of ±40° to ±60°.

As described above, the optical anisotropic diffusion layer 12 has the property that the incident light is strongly diffused in the incident light angle range of ±5° to ±20° close to the scattering central axis direction, but in a wider incident light angle range, the diffusion weakens and the linear transmittance increases.

Hereinafter, the range of two incident light angles with respect to the intermediate linear transmittance between the maximum linear transmittance and the minimum linear transmittance will be referred to as a diffusion region (the width of the diffusion region will be referred to as a "diffusion width"), and the other incident light angle range will be referred to as a non-diffusion region (transmission region). Taking the case of the optical profile shown in FIG. 22 as an example, the diffusion and non-diffusion regions will be described in detail. In this optical profile, the maximum linear transmittance is about 52%, the minimum linear transmittance is about 9%, and an intermediate value between them is about 30%. The range between two incident light angles with respect to the intermediate value (the inside between two broken lines of the optical profile shown in FIG. 22 (including an incident light angle of 0°)) corresponds to the diffusion region, and the other incident light angle range corresponds to the non-diffusion region (transmission region).

On the other hand, in the optical anisotropic diffusion layer 12A having a pillar structure, the transmitted light is approximately circular and has substantially the same light diffusivity in an x direction and a y direction (which is perpendicular to the x direction), as is seen from the state of the transmitted light in FIG. 19. That is, in the optical anisotropic diffusion layer 12A having a pillar structure, the diffusion is isotropic. In addition, as shown in FIG. 22, even if the incident light angle is changed, a change in light diffusivity (especially an optical profile near the boundary between the non-diffusion and diffusion regions) is relatively gradual.

In contrast, in the optical anisotropic diffusion layer 12B having a louver structure, the transmitted light is plate-like and its light diffusivity greatly varies between an x direction and a y direction, as is seen from the state of the transmitted light in FIG. 20. That is, in the optical anisotropic diffusion layer 12B having a louver structure, the diffusion is anisotropic. Specifically, in the example shown in FIG. 20, the diffusion is wider in the y direction than in the case of the pillar structure, but narrower in the x direction than in the case of the pillar structure.

FIG. 23 is a diagram showing a three-dimensional polar coordinate expression to illustrate the scattering central axis.

Assuming that the surface of the optical anisotropic diffusion layer is an xy plane and the normal is a z axis in the three-dimensional polar coordinate expression, the scattering central axis can be represented by polar angle θ and azimuth angle φ.

Note that the positive scattering central axis angle is defined as + if the scattering central axis is inclined toward one side with respect to the plane passing through both a predetermined symmetric axis (for example, y axis passing through the center of gravity of the optical anisotropic diffusion layer) in the in-plane direction of the optical anisotropic diffusion layer and the normal of the optical anisotropic diffusion layer, and it is defined as − if the scattering central axis is inclined toward the other side.

Each of the optical anisotropic diffusion layers may have a plurality of pillar region groups having different slopes (each of the groups includes a set of pillar regions having the same slope). If, therefore, each of the layers includes a plurality of pillar region groups having different slopes, a plurality of scattering central axes are provided to correspond to the slopes of the pillar region groups.

(Structure of Optical Anisotropic Diffusion Layer)

FIG. 24 is a schematic sectional view showing an example of the optical anisotropic diffusion layer 12.

The optical anisotropic diffusion layer 12 includes a matrix region 20 and a plurality of structures 21 whose refractive index differs from that of the matrix region 20. The structures 21 are pillar or plate-like regions and correspond to the pillar structure 21A in FIG. 19 or the louver structure 21B in FIG. 20. Each of the structures 21 extends from one surface side of the optical anisotropic diffusion layer 12 toward the other surface side thereof.

One end of each of the structures 21 reaches one surface of the optical anisotropic diffusion layer 12. The other end thereof may or may not reach the other surface of the optical anisotropic diffusion layer 12.

In this example, the extending direction of the structures 21 is inclined to the thickness direction of the optical anisotropic diffusion layer 12 (normal direction). However, the optical anisotropic diffusion layer 12 is not limited to the structures, and the extending direction of the structures 21 and the thickness direction of the optical anisotropic diffusion layer 12 may coincide with each other.

The refractive index of the matrix region 20 has only to differ from that of the structures 21, but the degree to which the refractive indices are different is not particularly limited but relative. If the refractive index of the matrix region 20 is lower than that of the structures 21, the matrix region 20 serves as s a low refractive index region. Conversely, if the refractive index of the matrix region 20 is higher than that of the structures 21, the matrix region 20 serves as a high refractive index region.

The average height H of the structures 21 in the thickness direction of the optical anisotropic diffusion layer 12 is 80% or more of the thickness T of the optical anisotropic diffusion layer 12, preferably 90% or more, and even more preferably 95% or more. If the ratio of the average height H to the thickness T is the above lower limit or more, sufficient scattering properties can easily be obtained. The upper limit of the average height H is the thickness T.

The average height H is obtained by measuring the heights of, for example, ten structures 21 using an optical microscope and determining an average value of the measured heights. The height of each structure 21 is the thickness of the optical anisotropic diffusion layer 12 from the lower end of the structure 21 to the upper end thereof when the optical anisotropic diffusion layer 12 is placed horizontally with one surface downside and the other surface upside.

There is no particular limitation on the structure shape of a section perpendicular to the extending direction of the structures 21. The structure shape may include a circular shape, an elliptical shape, a polygonal shape, an indefinite shape, a mixture of these shapes, and the like.

In the structure shape of a section perpendicular to the extending direction of the structures 21, if the maximum diameter is a long diameter LA and the maximum diameter in a direction orthogonal to the long diameter LA is a short diameter SA, the aspect ratio (LA/SA) expressed as the ratio of the long diameter LA to the short diameter SA is preferably less than 50, more preferably less than 10 and even more preferably less than 5. The lower limit of the aspect ratio (LA/SA) is 1. That is, the long diameter LA and the short diameter SA may have the same value.

The long diameter LA (the maximum value of the long diameters LA of the structures 21) is preferably 0.5 μm or more, more preferably 1.0 μm or more, and even more preferably 1.5 μm or more. As the long diameter LA decreases, light diffusivity and light condensing property may become insufficient.

The long diameter LA is preferably 8.0 μm or less, more preferably 3.0 μm or less, and even more preferably 2.5 μm or less. As the long diameter LA increases, the diffusion range may be narrowed. In addition, as the long diameter LA increases, light interference (rainbow) is likely to occur.

The short diameter SA (the maximum value of the short diameters SA of the pillar structures 21) is preferably 0.5 μm or more, more preferably 1.0 μm or more, and even more preferably 1.5 μm or more. As the short diameter SA decreases, light diffusivity and light condensing property may become insufficient.

The short diameter SA is preferably 5.0 μm or less, more preferably 3.0 μm or less, and even more preferably 2.5 μm or less. As the short diameter SA increases, the diffusion range may be narrowed.

The shape of a section perpendicular to the extending direction of the structures 21 can be confirmed by observing the surface of the optical anisotropic diffusion layer 12 by an optical microscope.

The long diameter LA and short diameter SA each can be obtained by observing the surface of the optical anisotropic diffusion layer 12 by an optical microscope, measuring the long diameters LA and short diameters SA of the sections of optionally selected twenty structures 21, for example, and determining an average value of the measured long diameters and an average value of the measured short diameters.

The aspect ratio (LA/SA) is obtained by dividing the average long diameter LA obtained above by the average short diameter SA obtained above.

The optical anisotropic diffusion layer 12 has a scattering central axis. In the optical anisotropic diffusion layer 12, the structures 21 are each formed so that its extending direction is parallel to the scattering central axis. The structures 21 in the same optical anisotropic diffusion layer 12 are therefore parallel to each other.

The extending direction and scattering central axis of each of the structures 21 need not be strictly parallel to each other, as long as they satisfy the law of refractive index (Snell's law). The Snell's law states that when light is incident from a medium with refractive index n1 to the interface of a medium with refractive index n2, relation "n1·sin θ1=n2 sin θ2" is established between incident light angle θ1 and refractive angle θ2. If, for example, n1 is equal to 1 (air) and n2 is equal to 1.51 (optical anisotropic diffusion layer), the extending direction (angle of refraction) of each of the structures 21 is about 19° while the slope of the scattering central axis (angle of incident light) is 30°. Even if the angle of incident light and the angle of refraction are different, this difference is included in the concept of parallel in this embodiment as long as it satisfies the Snell's law.

For light entering the optical anisotropic diffusion layer 12 at a predetermined incident light angle, diffusion of the light is preferred if the incident light angle is approximately parallel to the extending direction (alignment direction) of the structures 21, and transmission of the light is preferred if the incident light angle is not approximately parallel to the extending direction. If, therefore, the angle of light incident upon the optical anisotropic diffusion layer 12 changes, the linear transmittance also changes. Specifically, in the optical anisotropic diffusion layer 12, the incident light is strongly diffused within an incident light angle range (diffusion region) close to the extending direction of the structures 21, and the diffusion is weakened and the linear transmittance is enhanced in the broader incident light angle range (non-diffusion region).

In the plane formed by the normal of the optical anisotropic diffusion layer 12 and the scattering central axis thereof, the slope angle side of the scattering central axis can be positive (+) if the normal of the optical anisotropic diffusion layer is 0°. In this case, the scattering central axis angle $\theta$ is 0°<$\theta$<90°. If the scattering central axis coincides with the normal of the optical anisotropic diffusion layer ($\theta$=0°), the plane including the normal of the optical anisotropic diffusion layer can optionally be defined, and the positive or negative side of the angle can also be optionally defined.

The scattering central axis angle can be adjusted at a desired angle by changing the direction of light rays with which a composition containing a sheet-like photopolymerizable compound is irradiated when the optical anisotropic diffusion layer 12 is formed.

The optical anisotropic diffusion layer 12 preferably has a maximum linear transmittance of 20% or more, and more preferably 30% or more.

The optical anisotropic diffusion layer 12 is typically formed of a cured product of a composition containing a photopolymerizable compound. In curing the layer of the composition, regions with different refractive indices are formed. The composition containing a photopolymerizable compound will be described in detail later.

The thickness T of the optical anisotropic diffusion layer 12 is preferably 10 µm to 200 µm, more preferably 20 µm to 100 µm, and even more preferably 20 µm to 80 µm. If the thickness T is equal to or more the lower limit indicated above, sufficient light diffusivity can be obtained. If the thickness T is equal to or less than the upper limit indicated above, image sharpness is better. The thickness T is measured by the method described below.

<9> Method of Forming Optical Anisotropic Diffusion Layer

As a method of forming the optical anisotropic diffusion layer 12, there is a method disclosed in, for example, Jpn. Pat. Appln. KOKAI Publication No. 2005-265915 and Jpn. Pat. Appln. KOKAI Publication No. 2015-191178. This method mainly includes the following steps. In the present specification, both "photopolymerization" and "photocuring" mean that a photopolymerizable compound is polymerized by light.

(i-1) A step of providing a layer of a composition (hereinafter sometimes referred to as "photocurable composition") containing a photopolymerizable compound on a substrate.

(i-2) A step of receiving a parallel light beam from a light source and causing the parallel light beam to enter a photocurable composition as it is or as a directional light beam to cure a layer of the photocurable composition.

(Photocurable Composition)

A photocurable composition is a material that is polymerized and cured upon irradiation with light and typically contain a photopolymerizable compound and a photoinitiator. Examples of light include ultraviolet (UV) and visible light.

As the photocurable composition, for example, the following compositions can be used.

(1) Composition containing a single photopolymerizable compound and a photoinitiator.
(2) Composition containing a plurality of photopolymerizable compounds and a photoinitiator.
(3) Composition containing one or more photopolymerizable compounds, a polymer compound having no photopolymerization, and a photoinitiator.

In any of the above compositions, micron-order fine structures with different refractive indices are formed in the optical anisotropic diffusion layer 12 by light irradiation.

Even if there is only one type of photopolymerizable compound to form the optical anisotropic diffusion layer 12, a difference in refractive index is caused by a difference in density. The reason is as follows. Since the curing speed increases in a region where the intensity of light irradiation is high, polymerized and cured products move around the cured region, with the result that a region where the refractive index increases is formed and so is a region where the refractive index decreases.

In the above composition (1), therefore, it is preferable to use a photopolymerizable compound with a large refractive index change before and after photopolymerization. In the above compositions (2) and (3), it is preferable to combine a plurality of materials with different refractive indices. Note that a change in refractive index or a difference in refractive index is specifically 0.01 or more, preferably 0.05 or more, more preferably 0.1 or more.

(Photopolymerizable Compound)

As the photopolymerizable compound, there is a compound having a radical polymerizable or cationic polymerizable functional group (macromonomer, polymer, oligomer, monomer, etc.).

As the radical polymerizable functional group there is a functional group with an unsaturated double bond such as acryloyl, methacryloyl and allyl groups. As the cationic polymerizable functional group, there is an epoxy group, a vinyl ether group, an oxetane group, etc.

As the compound having a radical polymerizable functional group (radical polymerizable compound), there is a compound containing one or more unsaturated double bonds in molecules. Specific examples include acrylic oligomer called by the names of epoxy acrylate; urethane acrylate; polyester acrylate; polyether acrylate; polybutadiene acrylate; silicone acrylate; etc., and acrylate monomers such as 2-ethylhexyl acrylate; isoamyl acrylate; butoxyethyl acrylate; ethoxydiethylene glycol acrylate; phenoxyethyl acrylate; tetrahydrofurfuryl acrylate; isonorbornyl acrylate; 2-hydroxyethyl acrylate; 2-hydroxypropyl acrylate; 2-acryloxyphthalic acid; dicyclopentenyl acrylate; triethylene glycol diacrylate; neopentyl glycol diacrylate; 1,6-hexanediol diacrylate; EO adducts of bisphenol A; trimethylolpropane triacrylate; EO-modified trimethylolpropane triacrylate; pentaerythritol triacrylate; pentaerythritol tetraacrylate; ditrimethylolpropane tetraacrylate; and dipentaerythritol hexaacrylate. These compounds may be used alone or in combination. Methacrylate can be used as well, but generally acrylate is preferred over methacrylate because its photopolymerization rate is higher.

As the compound having a cationic polymerizable functional group (cationic polymerizable compound), there is a compound having one or more epoxy, vinyl ether or oxetane groups in molecules.

The compound having an epoxy group includes the following. However, it is not limited to the following.

Diglycidyl ethers of bisphenols such as 2-ethylhexyl diglycol glycidyl ether; glycidyl ether of biphenyl; bisphenol A; hydrogenated bisphenol A; bisphenol F; bisphenol AD; bisphenol S; tetramethylbisphenol A; tetramethylbisphenol F; tetrachlorobisphenol A; and tetrabromobisphenol A. Polyglycidyl ethers of novolac resins such as phenol novolac; cresol novolac; brominated phenol novolac; and orthocresol novolac. Diglycidyl ethers of alkylene glycols such as ethylene glycol; polyethylene glycol; polypropylene glycol; butanediol; 1,6-hexanediol; neopentyl glycol; trimethylolpropane; 1,4-cyclohexanedimethanol; EO adduct of bisphenol A; and PO adduct of bisphenol A. Glycidyl esters such as glycidyl esters of hexahydrophthalic acid and diglycidyl esters of dimeric acid. A cycloaliphatic epoxy compound such as 3,4-epoxycyclohexylmethyl-3',4'-epoxycyclohexanecarboxylate; 2-(3,4-epoxycyclohexyl-5,5-spiro-3,4-epoxy) cyclohexane-meta-dioxane; di(3,4-epoxycyclohexylmethyl) adipate; di(3,4-epoxy-6-methylcyclohexylmethyl) adipate; 3,4-epoxy-6-methylcyclohexyl-3',4'-epoxy-6'-methylcyclohexanecarboxylate; methylene bis (3,4-epoxycyclohexane), dicyclopentadiene diepoxide; di (3,4-epoxycyclohexylmethyl) ether of ethylene glycol; ethylene bis (3,4-epoxycyclohexanecarboxylate); lactone-modified 3,4-epoxycyclohexylmethyl-3',4'-epoxycyclohexanecarboxylate; tetra (3,4-epoxycyclohexylmethyl) butane tetracarboxylate; and di (3,4-epoxycyclohexylmethyl)-4,5-epoxytetrahydrophthalate.

Examples of a compound having a vinyl ether group include, but are not limited to, diethylene glycol divinyl ether, triethylene glycol divinyl ether, butanediol divinyl ether, hexanediol divinyl ether, cyclohexane dimethanol divinyl ether, hydroxybutyl vinyl ether, ethyl vinyl ether, dodecyl vinyl ether, trimethylolpropane trivinyl ether, and propenyl ether propylene carbonate. Although vinyl ether compounds are generally cationic polymerizable, radical polymerization is also possible by combining them with acrylates.

As a compound with an oxetane group, there are 1,4-bis [(3-ethyl-3-oxetanylmethoxy) methyl] benzene; 3-ethyl-3-(hydroxymethyl)-oxetane; and the like.

The foregoing cationic polymerizable compounds may be used alone or in combination. The photopolymerizable compounds are not limited to the above. In addition, fluorine atoms (F) may be introduced into the photopolymerizable compound to decrease the refractive index of the photopolymerizable compound and cause a sufficient refractive index difference. Sulfur atoms (S), bromine atoms (Br) and various metal atoms may be introduced into the photopolymerizable compound to increase the refractive index of the photopolymerizable compound and cause a sufficient refractive index difference. Furthermore, as disclosed in Japanese Unexamined Patent Publication No. 2005-514487, it is also effective to add functional ultrafine particles to the above photopolymerizable compounds by introducing a photopolymerizable functional group such as acrylic, methacrylic and epoxy groups onto the surface of ultrafine particles composed of metal oxides with high refractive index such as titanium oxide ($TiO_2$), zirconium oxide ($ZrO_2$) and tin oxide ($SnO_x$).

The photopolymerizable compound may include a photopolymerizable compound having a silicone skeleton. The photopolymerizable compound having a silicone skeleton is polymerized and cured in alignment with its structure (mainly ether linkages) to form a low refractive index region, a high refractive index region, or low and high refractive index regions. The use of a photopolymerizable compound having a silicone skeleton makes it easier to tilt a pillar structure (also called a pillar region) 21. Note that one of the matrix region 20 and pillar structure 21 corresponds to the low refractive index region and the other corresponds to the high refractive index region.

In the low refractive index region, it is preferable that there be relatively more silicone resin that is a cured product of the photopolymerizable compound having a silicone skeleton. This makes it easier to tilt the scattering central axis further. Since the silicone resin contains more silica (Si) than a compound having no silicone skeleton, a relative amount of silicone resin can be ascertained using an energy dispersive X-ray spectrometer (EDS) with the silica as an index.

The photopolymerizable compound having a silicone skeleton may be a monomer, an oligomer, a prepolymer or a macromonomer. Although there is no particular limitation on the type and number of radical or cationic polymerizable functional groups, it is preferable to have a multifunctional acryloyl or methacryloyl group because the crosslinking density increases and the difference in refractive index easily occurs as the number of functional groups increases. In addition, a compound with a silicone skeleton may be insufficient in compatibility with other compounds because of its structure, but in this case, it can be turned into a urethane to enhance the compatibility. Such compounds include silicone urethane (meth)acrylate having an acryloyl or methacryloyl group at its end. The (meth)acrylate means that it may be either acrylate or meta acrylate.

A photopolymerizable compound having a silicone skeleton and a compound having no silicone skeleton may be used in combination. This makes it easier to form the low and high refractive index regions separately, resulting in a higher degree of anisotropy.

As a compound having no silicone skeleton, a thermoplastic resin or a thermosetting resin can be used in addition to the photopolymerizable compound, and these can also be used in combination.

As the photopolymerizable compound, a polymer, an oligomer and a monomer having a radical or cationic polymerizable functional group can be used (however, none of them has a silicone skeleton).

As the thermoplastic resin, there are polyester, polyether, polyurethane, polyamide, polystyrene, polycarbonate, polyacetal, polyvinyl acetate, acrylic resin and their copolymers and modified products. If a thermoplastic resin is used, it is dissolved using a solvent, applied and dried. Then, a photopolymerizable compound having a silicone skeleton is cured by ultraviolet rays to form an optical anisotropic diffusion layer.

As the thermosetting resin, there are an epoxy resin, a phenolic resin, a melamine resin, a urea resin, unsaturated polyester and their copolymers and modified products. If a thermosetting resin is used, the photopolymerizable compound having a silicone skeleton is cured by ultraviolet rays and then heated appropriately. Then, the thermosetting resin is cured to form an optical anisotropic diffusion layer.

It is a photopolymerizable compound that is the most preferred compound having no silicone skeleton. It has excellent productivity, such as easy separation between low and high refractive index regions, no solvent or no drying process in using a thermoplastic resin, and no thermosetting process like a thermosetting resin.

If the photocurable composition includes a photopolymerizable compound having a silicone skeleton and a compound having no silicone skeleton, the ratio between the compounds in terms of mass ratio is preferably in the range of 15:85 to 85:15 and more preferably in the range of 30:70 to 70:30. With these ranges, the phase separation between the low and high refractive index regions easily proceed, and the pillar structure is easily inclined.

(Photoinitiator)

As photoinitiators for polymerizing a radical polymerizable compound, there are benzophenone; benzyl; Michler's ketone; 2-chlorothioxanthone; 2,4-diethylthioxanthone; benzoin ethyl ether; benzoin isopropyl ether; benzoin isobutyl ether; 2,2-diethoxyacetophenone; benzyl dimethyl ketal; 2,2-dimethoxy-1,2-diphenylethane-1-one; 2-hydroxy-2-methyl-1-phenylpropane-1-one; 1-hydroxycyclohexylphenyl ketone; 2-methyl-1-[4-(methylthio) phenyl]-2-morpholinopropanone-1; 1-[4-(2-hydroxyethoxy)-phenyl]-2-hydroxy-2-methyl-1-propane-1-one; bis(cyclopentadienyl)-bis(2,6-difluoro-3-(pill-1-yl) titanium; 2-benzyl-2-dimethylamino-1-(4-morpholinophenyl)-Butanone-1,2,4,6-trimethylbenzoyldiphenylphosphine oxide, and the like. These compounds may be used as alone or in combination.

Photoinitiators for polymerizing a cationic polymerizable compound are compounds that can generate an acid upon irradiation of light and polymerize the above cationic polymerizable compound with the generated acid, and in general, onium salts and metallocene complexes are suitably used. Diazonium salts, sulfonium salts, iodonium salts, phosphonium salts, and selenium salts are used as the onium salts, and anions such as $BF_4-$, $PF_6-$, $AsF_6-$ and $SbF_6-$ are used for these counterions. Examples include 4-chlorobenzenediazonium hexafluorophosphate; triphenylsulfonium hexafluoroantimonate; triphenylsulfonium hexafluoroantimonate; (4-phenylthiophenyl) diphenylsulfonium hexafluoroantimonate; (4-phenylthiophenyl) diphenylsulfonium hexafluoroantimonate; bis [4-(diphenylsulfonio) phenyl] sulfide-bis-hexafluoroantimonate; bis [4-(diphenylsulfonio) phenyl]sulfide-bis-hexafluorophosphate; (4-methoxyphenyl) diphenylsulfonium hexafluoroantimonate; (4-methoxyphenyl) phenyliodonium hexafluoroantimonate; bis (4-t-butylphenyl) iodonium hexafluorophosphate; benzyl triphenylphosphonium hexafluoroantimonate; triphenylselenium hexafluorophosphate (η5-isopropylbenzene) (η5-cyclopentadienyl) iron (II) hexafluorophosphate, etc., but the compounds are not limited to the examples. The compounds may be used alone or in combination.

In the photocurable composition, the content of the photoinitiator is preferably 0.01 to 10 parts by mass, more preferably 0.1 to 7 parts by mass, and even more preferably 0.1 to 5 parts by mass with respect to 100 parts by mass of the photopolymerizable compound. If it is not less than 0.01 parts by mass, photocurability is satisfactory. If it is not more than 10 parts by mass, the pillar structure is formed satisfactorily. In addition, only the surface can be cured to prevent the inside from decreasing in curability and from being colored.

As polymer compounds having no photopolymerization, there are an acrylic resin, a styrene resin, a styrene-acrylic copolymer, a polyurethane resin, a polyester resin, an epoxy resin, a cellulosic resin, a vinyl acetate resin, a vinyl chloride-vinyl acetate copolymer, a polyvinyl butyral resin, etc. These polymer compounds and photopolymerizable compounds need to have sufficient compatibility before photocuring, but various organic solvents, plasticizers, etc. can be used to ensure the compatibility. When acrylate is used as a photopolymerizable compound, an acrylic resin is preferred as a polymer compound having no photopolymerization in terms of their compatibility.

Photoinitiators are usually used by dissolving powder directly into a photopolymerizable compound, but a photoinitiator previously dissolved into a very small amount of solvent at a high concentration can be used if its dissolution is poor. As the solvent, there are ethyl acetate, butyl acetate, acetone, methyl ethyl ketone, methyl isobutyl ketone, cyclohexanone, toluene, xylene, and the like.

It is also possible to add various known dyes and sensitizers to improve the photopolymerization.

A thermosetting initiator that can cure a photopolymerizable compound by heating can also be used together with a photoinitiator. In this case, it is expected that the polymerization curing of the photopolymerizable compound can be further promoted and completed by heating after photocuring.

(Step (i-1))

In step (i-1), a layer of the photocurable composition is provided on a base.

The base is not particularly limited but may include, for example, glass such as quartz glass and soda glass and a resin film. As the resin film, there are polyethylene terephthalate (PET), triacetyl cellulose (TAC), polyethylene naphthalate (PEN), polymethyl methacrylate (PMMA), polycarbonate (PC), a polyimide (PI), polyethylene (PE), polypropylene (PP), polyvinyl alcohol (PVA), polyvinyl chloride (PVC), a cycloolefin copolymer (COC), a norbornene-containing resin, polyethersulfone (PES), cellophane, aromatic polyamides, and the like.

Conventional coating and printing methods are applied to a method of providing a layer of the photocurable composition on a base. Specifically, coating such as air doctor coating, bar coating, blade coating, knife coating, reverse coating, transfer roll coating, gravure roll coating, kiss coating, cast coating, spray coating, slot orifice coating, calendar coating, dam coating, dip coating and die coating, intaglio printing such as gravure printing, and printing such as stencil printing such as screen printing can be used. If the photocurable composition has a low viscosity, a weir can be provided at a constant height around the base to cast the photocurable composition in the space enclosed by the weir.

After a layer of the photocurable composition is provided, a mask that locally changes the intensity of light irradiation may be stacked on the light-irradiation side of the layer of the photocurable composition in order to prevent oxygen inhibition of the photocurable composition and to form the structure 21 with efficiency. Preferably, the mask is made of a light-absorbing filler such as carbon dispersed in a matrix, with a part of the incident light absorbed by the carbon, but with an opening that allows light to penetrate sufficiently. The matrix may include transparent plastics such as PET, TAC, polyvinyl acetate (PVAc), PVA, acrylic resin, polyethylene, inorganic materials such as glass and quartz, and sheets containing these matrices and patterning for controlling the amount of ultraviolet transmission and pigments absorbing ultraviolet rays. If this mask is not used, it is also possible to prevent oxygen inhibition of the photocurable composition by light irradiation under a nitrogen atmosphere. Even stacking a normal transparent film on the layer of the photocurable composition is effective in preventing oxygen inhibition and promoting the formation of the structure 21.

(Step (i-2))

In step (i-2), first, a parallel light beam is obtained from a light source. Then, the parallel light beam is caused to enter the layer of the photocurable composition as it is or as a directional light beam to cure the layer of the photocurable composition.

As the light source, usually, a short-arc ultraviolet generating light source is used, and specifically a high-pressure mercury lamp, a low-pressure mercury lamp, a metal halide lamp, a xenon lamp, etc. can be used.

If the layer of the photocurable composition is irradiated with a light beam parallel to a desired scattering central axis to cure the photocurable composition, a plurality of pillar cured regions (pillar regions) are formed in the layer of the photocurable composition to extend along the irradiation direction of the parallel light beam.

As a method of obtaining the parallel light beam, there are a method in which a point light source is placed and an optical lens such as a Fresnel lens is placed between the point light source and the layer of a photocurable composition to emit a parallel light beam, and a method in which a linear light source is placed and a collection of cylindrical objects is interposed between the linear light source and the layer of a photocurable composition to emit light through the cylindrical objects (see Jpn. Pat. Appln. KOKAI Publication No. 2005-292219). The use of the linear light source is preferable because it allows continuous production. As the linear light source, a chemical lamp (fluorescent lamp that emits ultraviolet rays) can be used. Chemical lamps with diameters of 20 mm to 50 mm and emission lengths of about 100 mm to 1500 mm are commercially available and can be selected appropriately according to the size of the optical anisotropic diffusion layer 12 to be prepared.

The parallel light beam obtained above may be converted into a directional light beam. If the spread of the directional light beam is adjusted, the size of the pillar regions to be formed (aspect ratio, short diameter SA, long diameter LA, etc.) can be appropriately determined.

The directional light beam is obtained by making a parallel light beam incident upon a directional diffusion element. This directional diffusion element has only to give directivity to the incident parallel light beam. However, for example, a method of including a needle-like filler with a high aspect ratio in the directional diffusion element and aligning the needle-like filler so that the longitudinal direction extends in a specific direction and a method using a commercially available lenticular lens can be employed.

The aspect ratio of the directional light beam is preferably 50 or less. Almost in accordance with the aspect ratio, the aspect ratio of the pillar regions is formed.

The light beam with which the layer of a photocurable composition is irradiated needs to have a wavelength capable of curing a photopolymerizable compound, and light with a wavelength centered at 365 nm of a mercury lamp is usually used. If the optical anisotropic diffusion layer 12 is formed using the wavelength band, the illuminance is preferably in the range of 0.01 mW/cm$^2$ to 100 mW/cm$^2$, and more preferably in the range of 0.1 mW/cm$^2$ to 20 mW/cm$^2$. Irradiation time of light is not particularly limited, but 10 seconds to 180 seconds is preferred and 30 seconds to 120 seconds is more preferred.

If the low-illuminance light is emitted for a relatively long period of time as described above, a specific internal structure is formed in the photocurable composition layer; however, only the light emission may cause unreacted monomer components to remain, resulting in stickiness and problems in handling and durability. In such cases, the remaining monomers can be polymerized by emitting additional high-intensity light of 1000 mW/cm$^2$ or more. In this case, light may be emitted from the opposite side of the mask stacked side.

Then, the optical anisotropic diffusion layer 12 can be obtained by peeling the base.

The following is a method used for measurement and evaluation in each example.

(Thickness of Optical Anisotropic Diffusion Layer)

A microtome was used to form a section of the optical anisotropic diffusion layer, observe the section under an optical microscope, and measure the thicknesses of ten portions thereof. The average of the measured thicknesses was set as the thickness of the optical anisotropic diffusion layer.

(Measurement of Scattering Central Axis Angle and Linear Transmittance of Optical Anisotropic Diffusion Layer)

Using a Goniophotometer (made by Genesia Corporation) in which the light projection angle of the light source 30 and the light reception angle of the detector 31 can optionally be changed, as shown in FIG. 21, the linear transmittance of each of the optical anisotropic films (optical anisotropic diffusion layers) was measured for the examples and comparison examples. The detector 31 was fixed at a position to receive straight light from the fixed light source 30, and in a sample holder between them, each of the optical anisotropic films for the examples and comparison examples was set as a sample. As shown in FIG. 21, the sample was rotated with the straight line L through the sample as the central axis of the rotation, and the amount of straightly transmitted light corresponding to each incident light angle was measured. With this evaluation method, the range of incident angles of light to be diffused can be evaluated. The straight line L corresponds to the x direction of the optical anisotropic diffusion layer, which is the center of the rotation, as shown in FIG. 19 or 20. To measure the amount of linearly transmitted light, the wavelength in the visible light region was measured using a luminous efficiency filter.

Based on the optical profile obtained as a result of the foregoing measurements, various types of linear transmittance and the scattering central axis angle, which is an incident light angle at which the optical profile has an approximately symmetrical shape, were determined.

(Measurement of Aspect Ratio of Pillar Regions (Surface Observation of Optical Anisotropic Diffusion Layer))

One surface (ultraviolet-irradiated side) of each of the optical anisotropic films (optical anisotropic diffusion layers) for the examples and comparison examples was observed under an optical microscope to measure the long diameter (maximum diameter) and the short diameter (maximum diameter in a direction orthogonal to the long diameter) of the pillar regions. The average long diameter and average short diameter were calculated by obtaining the average values of selected twenty structures. In addition, the ratio of the average long diameter to the average short diameter was determined as an aspect ratio.

(Production Example of Optical Anisotropic Diffusion Layer)

If the temperature of a liquid film heated by the photocurable composition, the thickness of the liquid film, and the direction and directivity of light with which the photocurable composition is irradiated are adjusted using the manufacturing method described in Jpn. Pat. Appln. KOKAI Publication No. 2005-265915 and referring to the description of Jpn. Pat. Appln. KOKAI Publication No. 2015-191178, an optical anisotropic diffusion layer including a matrix region and a plurality of pillar regions and having the characteristics described in each table was obtained.

<10> Specific Configuration Example of Liquid Crystal Display Device 1

Figure 25:
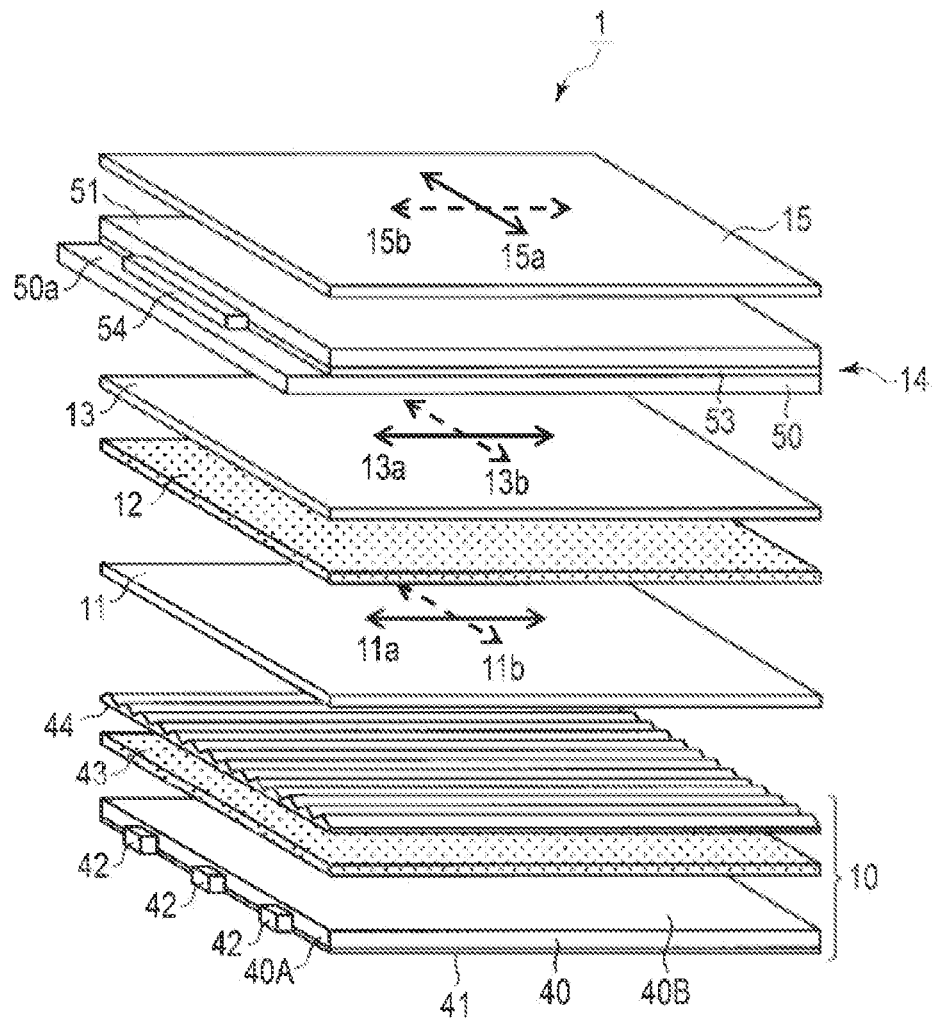
FIG. 25 is an exploded perspective view of the liquid crystal display device according to the embodiment.
Figure 26:
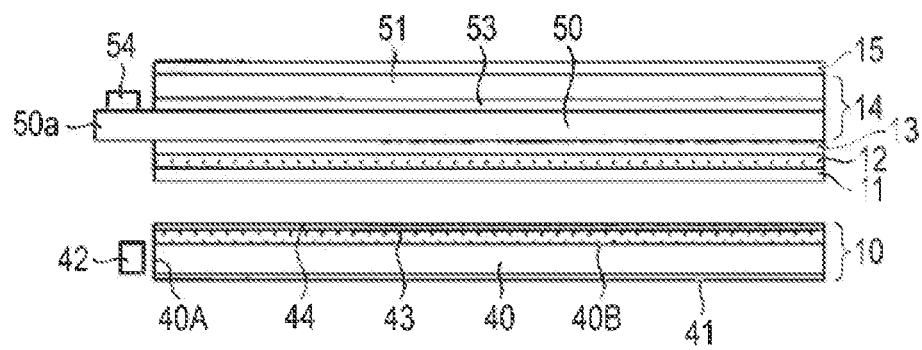
FIG. 26 is a side view of the liquid crystal display device according to the embodiment.

A specific configuration example of the liquid crystal display device 1 will be described. FIG. 25 is an exploded perspective view of the liquid crystal display device 1 according to the embodiment. FIG. 26 is a side view of the liquid crystal display device 1 according to the embodiment.

The liquid crystal display device 1 of the present embodiment is a transmissive/reflective liquid crystal display device which performs reflection display using external light incident from the observation side and transmission display using illumination light from a lighting device placed on the opposite side of the observation side. The transmissive/reflective liquid crystal display device is also called semi-transmissive liquid crystal display. The liquid crystal display device 1 includes a lighting device 10, a reflective polarizing plate 11, an optical anisotropic diffusion layer 12, a polarizing plate 13, a liquid crystal panel 14 and a polarizing plate 15, which arranged in order from the bottom (from the opposite side of the observation side).

The lighting device 10 is placed on the opposite side of the observation side of the liquid crystal panel 14. The lighting device 10 emits illumination light toward the liquid crystal panel 14. The lighting device 10 also reflects light (mainly external light), which is emitted from the observation side and transmitted through the liquid crystal panel 14, toward the liquid crystal panel 14.

The lighting device 10 includes a light guide plate 40, a reflecting film 41, a light source 42, a diffusion sheet 43 and a prism sheet 44. The reflecting film 41, light guide plate 40, diffusion sheet 43 and prism sheet 44 are arranged in parallel to each other in order from the bottom.

The light guide plate 40 is a transparent plate-like member having an area corresponding to the entire screen area of the liquid crystal panel 14 and includes, for example, a rectangular incidence plane 40A and an emission plane 40B. The incidence plane 40A is one end face of the light guide plate 40, which is substantially parallel to a direction in which the lighting device 10 and the liquid crystal panel 14 are stacked one on another. The emission plane 40B is the other end face of the light guide plate 40, which extends in a direction substantially orthogonal to the direction in which the lighting device 10 and the liquid crystal panel 14 are stacked one on another, and is located on a side of the liquid crystal panel 14.

The light source 42 is placed to face the incidence plane 40A in the vicinity of the incidence plane 40A. The lighting device 10 of the present embodiment includes a plurality of light sources 42. The light sources 42 emit light toward the incidence surface 40A of the light guide plate 40. The light sources 42 are each configured by light-emitting elements such as light-emitting diodes (LED).

The reflecting film 41 is provided on the opposite side of the emission plane 40B of the light guide plate 40. The reflecting film 41 reflects, toward the emission plane 40B, light incident on the light guide plate 40 from the incidence plane 40A and light incident on the light guide plate 40 from the emission plane 40B.

The diffusion sheet 43 is interposed between the emission plane 40B of the light guide plate 40 and the prism sheet 44. The diffusion sheet 43 is formed of, for example, a resin film in which scattered particles are dispersed.

The prism sheet 44 is a transparent member one surface of which is close to the light guide plate 40 and formed in a flat shape and the other surface of which is formed in a prism shape to collect the light emitted from the emission plane 40B. That is, on the surface of the prism sheet 44, which is close to the liquid crystal panel 14, a plurality of elongated microprisms are arranged in a direction orthogonal to their longitudinal directions, and the microprisms are arranged in parallel to each other. The prism sheet 44 collects the light emitted from the emission plane 40B of the light guide plate 40 and irradiates the liquid crystal panel 14.

The lighting device 10 may include two prism sheets whose prisms are orthogonal to each other in their longitudinal directions.

When the liquid crystal display device 1 performs transmission display, light emitted from the light source 42 and struck on the light guide plate 40 from its incidence plane 40A is guided through the entire light guide plate 40 while being repeatedly reflected by the reflecting film 41 and internally reflected by the emission plane 40B of the light guide plate 40, and is emitted from the entire emission plane 40B of the light guide plate 40. The light emitted from the emission plane 40B of the light guide plate 40 is diffused by the diffusion sheet 43 and further collected by the prism sheet 44. Thus, illumination light with brightness distribution with a high front brightness (brightness of light emitted in a direction near the normal of the liquid crystal panel 14) is emitted toward the liquid crystal panel 14.

The lighting device 10 has a function of causing light to enter the liquid crystal panel 14 from its observation side and reflecting the light transmitted through the liquid crystal panel 14 toward the liquid crystal panel 14. Light transmitted through the liquid crystal panel 14 and entering the light guide plate 40 from its emission plane 40B is reflected by the reflecting film 41 and emitted from the entire emission plane 40B of the light guide plate 40. The light emitted from the emission plane 40B of the light guide plate 40 is diffused by the diffusion sheet 43 and focused by the prism sheet 44, and reflected light with a high front brightness distribution is emitted toward the liquid crystal panel 14.

In the examples shown in FIGS. 25 and 26, the reflecting film 41 of the lighting device 10 is placed in contact with the surface of the light guide plate 40 that is opposed to the emission plane 40B, but the reflecting film 41 may be placed with a space between the reflecting film 41 and the light guide plate 40. In this case, the light incident from the incidence surface 40A of the light guide plate 40 is internally reflected toward the emission plane 40B by the surface of the light guide plate 40 that is opposed to the emission plane 40B, and leaked light transmitted through the interface between the opposed surface and an air layer in the space is reflected by the reflection film 41 and returned to the inside of the light guide plate 40.

Figure 27:
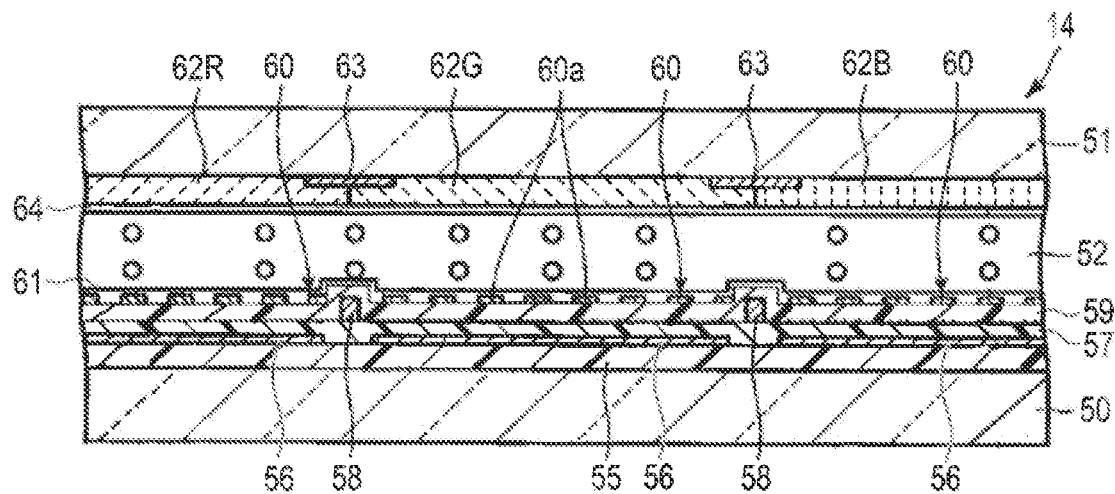
FIG. 27 is a sectional view of a liquid crystal panel included in the liquid crystal display device.

FIG. 27 is a sectional view of the liquid crystal panel 14 included in the liquid crystal display device 1. In FIG. 27, part of the liquid crystal panel 14 is shown in an enlarged view. The liquid crystal panel 14 is, for example, an active matrix liquid crystal display element.

The liquid crystal panel 14 includes a pair of substrates (first substrate 50 and second substrate 51), a liquid crystal layer 52 and a display driver 54.

The first and second substrates 50 and 51 are arranged opposite to each other with a predetermined space between them. The first and second substrates 50 and 51 are transparent substrates that transmit light from the observation side and the lighting device 10, and are configured by transparent insulating materials such as glass.

One of the first and second substrates 50 and 51, for example, the first substrate 50 opposite to the observation side, is provided with a plurality of first pixel electrodes 56 corresponding to a plurality of pixels, a plurality of switching elements (not shown) corresponding to the first pixel electrodes 56, a plurality of scanning lines (not shown), a plurality of signal lines 58, and a plurality of second pixel electrodes 60 each including a plurality of elongated electrode units 60a and corresponding to the first pixel electrodes 56. The switching element is formed of a thin film transistor (TFT).

Although the TFT is not shown in FIG. 27, it is placed closed to an intersection of a scanning line and a signal line 58, and includes a gate electrode on the first substrate 50, a transparent gate insulating film 55 covering the gate electrode on almost the entire first substrate 50, an i-type semiconductor film opposed to the gate electrode on the gate insulating film 55, and drain and source electrodes provided on both sides of the i-type semiconductor film, respectively, through n-type semiconductor films, respectively.

The scanning lines are provided on the first substrate 50. The scanning lines are arranged along one side of the row of each of the first pixel electrodes 56. Each of the scanning lines is electrically connected to the gate electrodes of a plurality of TFTs arranged in the corresponding row. The scanning lines supply gate signals to the TFTs.

The first pixel electrodes 56 are provided on the gate insulating film 55. The first pixel electrodes 56 are arranged in a matrix in the row and column directions. Each of the first pixel electrodes 56 is electrically connected to the drain electrode of the corresponding TFT. An insulating film 57 is provided on the first pixel electrodes 56 and the gate insulating film 55.

The signal lines 58 are provided on the insulating film 57. The signal lines 58 are arranged along one side of the row of each of the first pixel electrodes 56. Each of the signal lines 58 is electrically connected to the source electrodes of the TFTs included in the corresponding row. The signal lines 58 supply data signals to the first pixel electrodes 56 via the TFTs. An insulating layer 59 is provided on the signal lines 58 and the insulating film 57.

The second pixel electrodes 60 are provided on the insulating layer 59 and above the first pixel electrodes 56. A common voltage is applied to the second pixel electrodes 60.

The liquid crystal panel 14 includes three color filters 62R, 62G and 62B of red, green and blue which correspond to a plurality of pixels, respectively. The color filters 62R, 62G and 62B are provided on one of the paired substrates 50 and 51, for example, the second substrate 51. A light shielding film (black matrix) 63 is provided on the second substrate 51 and at the boundary of the pixels.

A pair of alignment films 61 and 64 are provided on the opposed inner surfaces of the first and second substrates 50 and 51, respectively to cover the first and second pixel electrodes 56 and 60 and the color filters 62R, 62G and 62B. The alignment films 61 and 64 are each aligned by being rubbed in a predetermined direction.

In the present embodiment, the liquid crystal panel 14 is, for example, a transverse electric field controlled liquid crystal display device. If nematic liquid crystal with positive dielectric anisotropy is used for the liquid crystal layer 52, the alignment films 61 and 64 are rubbed in a direction along the length direction of the elongated electrode units 60a of the second pixel electrodes 60, that is, in a direction parallel to the vertical direction of the screen area.

On the other hand, if nematic liquid crystal with negative dielectric anisotropy is used for the liquid crystal layer 52, the alignment films 61 and 64 have only be rubbed in a direction orthogonal to the length direction of the elongated electrode units 60a of the second pixel electrodes 60 (a direction parallel to the horizontal direction in the screen area).

The first and second substrates 50 and 51 are bonded together via a frame-like seal member 53 (see FIGS. 25 and 26) surrounding a screen area in which a plurality of pixels are arranged in a matrix. The liquid crystal layer 52 is sealed in an area surrounded by the seal member 53 in a gap between the first and second substrates 50 and 51.

The liquid crystal layer 52 is placed in contact with the alignment films 61 and 64 between the first and second substrates 50 and 51, and the liquid crystal molecules in the liquid crystal layer 52 are aligned in a state defined by the alignment of the alignment films 61 and 64.

The first substrate 50 of the liquid crystal panel 14 has an overhanging portion 50a (see FIGS. 25 and 26) that overhangs outward from an end portion of the second substrate 51. The scanning lines and signal lines 58 provided on the first substrate 50 are electrically connected to a display driver 54 mounted on the overhanging portion 50a.

The polarizing plate 13 has an absorption axis 13a and a transmission axis 13b which are orthogonal to each other. The polarizing plate 15 has an absorption axis 15a and a transmission axis 15b which are orthogonal to each other. The absorption axis 15a of the polarizing plate 15 is set to be orthogonal to the absorption axis 13a of the polarizing plate 13. The polarizing plates 13 and 15 are absorption polarizing plates that transmit linearly polarized light having a vibration plane of light parallel to the transmission axis and absorb linearly polarized light having a vibration plane of light parallel to the absorption axis. The polarizing plate 15, which is on the observation side, may be formed of an anti-glare polarizing plate whose outer surface is treated to prevent external light from being reflected.

The paired polarizing plates 13 and 15 are arranged to sandwich the first and second substrates 50 and 51. The polarizing plates 13 and 15 are fixed by aligning the directions of the absorption axes 13a and 15a such that the contrast of display can sufficiently be increased between the time when no electric field is applied between the first and second pixel electrodes 56 and 60 and the time when an electric field is applied therebetween. The polarizing plates 13 and 15 are arranged, for example, with the transmission axis of one of the polarizing plates parallel or orthogonal to the rubbing direction (not shown) of the alignment films 61 and 64 and with the transmission axis of the other polarizing plate orthogonal or parallel to the transmission axis of the one of the polarizing plates.

The reflective polarizing plate 11 is placed between the lighting device 10 and the optical anisotropic diffusion layer 12. The reflective polarizing plate 11 has a reflection axis 11a and a transmission axis 11b that are orthogonal to each other. The reflection axis 11a of the reflective polarizing plate 11 is set parallel to the absorption axis 13a of the polarizing plate 13. The reflective polarizing plate 11 reflects linearly polarized light having a light vibration plane parallel to the reflection axis and transmits linearly polarized light having a light vibration plane parallel to the transmission axis.

The liquid crystal panel 14 is not limited to one with the first and second pixel electrodes 56 and 60 formed to form a plurality of pixels on the inner surface of the substrate, but may also be one with a plurality of pixel electrodes arranged in a matrix in the row and column directions on the inner surface of the first substrate 50 (the surface closer to the liquid crystal layer 52) and connected to a plurality of TFTs, respectively and with a single-film-shaped counter electrode, which is opposed to the pixel electrodes, provided on the inner surface of the second substrate 51 (the surface closer to the liquid crystal layer 52). Specifically, the liquid crystal panel 14 is a twisted nematic (TN) liquid crystal display element, and the alignment films 61 and 64 formed on their respective inner surfaces of the paired substrates (first and second substrates 50 and 51) are aligned in directions orthogonal to each other, and the liquid crystal molecules of the liquid crystal layer 52 may be twisted substantially at a twist angle of 90° between the paired substrates.

In addition, the liquid crystal panel 14 may be any one of a super twisted nematic (STN) type in which liquid crystal molecules are twisted between paired substrates at a twist angle in the range of 1800 to 270°, a vertical alignment type in which liquid crystal molecules are aligned substantially perpendicular to the substrate surfaces of a pair of substrates, a non-twisted horizontal alignment type in which the long axes of liquid crystal molecules are aligned in one direction and substantially parallel to the substrate surfaces of the paired substrates, a bend alignment type in which liquid crystal molecules are bent, and a ferroelectric or antiferroelectric liquid crystal display element.

<11> Advantageous Effects of Embodiment

The present embodiment makes it possible to achieve the liquid crystal display device 1 capable of transmission display using illumination light from the lighting device 10 placed opposite to the observation side and reflection display using external light incident from the observation side.

The optical anisotropic diffusion layer 12 with incident light angle dependence of light diffusivity is provided between the reflective polarizing plate 11 and the polarizing plate 13. Then, the value k of the optical anisotropic diffusion layer 12 is set to a desired value. Thus, the reflection characteristics of the liquid crystal display device 1 can be improved. In addition, the reflection display can be further brightened while maintaining the transmitted display.

Moreover, a transmissive/reflective liquid crystal display device can be achieved using the reflective polarizing plate 11 and the optical anisotropic diffusion layer 12 without providing a reflection film defining a reflection region in the liquid crystal panel 14.

In this specification, the terms "plate," "film," "sheets," "layer" and the like are ones each illustrating a member and are not limited to their materials. These terms may be replaced by various members having the functions described in the specification.

In this specification, for example, the terms "parallel," "orthogonal," "vertical" and "same" and the values of length and angle, which specify shapes, geometric conditions and their degrees, are interpreted without being bound by their exact meanings, including the extent to which similar functions can be expected.

The present invention is not limited to the foregoing embodiments, but a variety of modifications can be made without departing from the spirit of the invention when the invention is reduced to practice. The embodiments can be combined as appropriate, which can bring about advantageous effects. Furthermore, the foregoing embodiments include a variety of inventions, and the inventions can be extracted by selecting and combining a plurality of structural elements. For example, even though some of the structural elements are deleted from the embodiments, a configuration from which the structural elements are deleted can be extracted as an invention if the problem can be solved and an advantageous effect can be obtained.

REFERENCE SIGNS LIST

1 . . . Liquid crystal display device, 10 . . . Lighting device, 11 . . . Reflective polarizing plate, 12 . . . Optical anisotropic diffusion layer, 13 . . . Polarizing plate, 14 . . . Liquid crystal panel, 15 . . . Polarizing plate, 16 . . . Optical member, 20 Matrix region, 21 . . . Pillar structure, 30 . . . Light source, 31 . . . Detector, 40 . . . Light guide plate, 41 . . . Reflecting film, 42 . . . Light source, 43 . . . Diffusion sheet, 44 . . . Prism sheet, 50 . . . First substrate, 51 . . . Second substrate, 52 . . . Liquid crystal layer, 53 . . . Seal member, 54 . . . Display driver, 55 . . . Gate insulating film, 56 . . . First pixel electrode, 57 . . . Insulating film, 58 . . . Signal line, 59 . . . Insulating layer, 60 . . . Second pixel electrode, 61 . . . Alignment film, 62R, 62G, 62B . . . Color filter, 63 . . . Light shielding film, 64 . . . Alignment film

The invention claimed is:

1. An optical member comprising:
a first polarizing plate having an absorption axis and a transmission axis which are orthogonal to each other;
a reflective polarizing plate having a reflection axis and a transmission axis which are orthogonal to each other; and
an optical anisotropic diffusion layer which is provided between the first polarizing plate and the reflective polarizing plate and a linear transmittance which varies according to an incident light angle,
wherein:
light diffusivity of the optical anisotropic diffusion layer is defined by a plane which has a horizontal axis representing the incident light angle and a vertical axis representing the linear transmittance, the plane comprising a negative area on a left side with respect to an incident light angle 0° and a positive area on a right side with respect to the incident light angle 0°;
the optical anisotropic diffusion layer has a scattering central axis that is an axis of symmetry regarding the light diffusivity;
if a scattering central axis angle, which is an angle formed by a normal of the optical anisotropic diffusion layer and the scattering central axis, is θ, the scattering central axis angle θ is more than 0° and less than 90°;
if an incident light angle at which the linear transmittance becomes maximum in the negative area is α, the angle α is more than −90° and less than 0°;
if an incident light angle at which the linear transmittance becomes minimum between the scattering central axis angle θ and the angle α is β, the angle β is more than the angle α and less than the scattering central axis angle θ; and
a value k of the optical anisotropic diffusion layer is expressed as follows:

$k$=(linear transmittance at the scattering central axis angle θ−linear transmittance at the angle β)/linear transmittance at the angle α, wherein $k$ is 0.18 or more.

2. The optical member of claim 1, wherein the linear transmittance at the angle α is 20% or more.

3. The optical member of claim 1, wherein the scattering central axis angle θ is more than 0° and equal to or less than 30°.

4. The optical member of claim 1, wherein the optical anisotropic diffusion layer includes a matrix region, and a plurality of pillar regions provided in the matrix region, and
the plurality of pillar regions extend in a thickness direction of the matrix region, and have a refractive index that differs from a refractive index of the matrix region.

5. The optical member of claim 1, wherein the reflection axis of the reflective polarizing plate is set parallel to the absorption axis of the first polarizing plate.

6. A liquid crystal display device comprising:
the optical member of claim 1;
a liquid crystal panel including a liquid crystal layer; and
a second polarizing plate having an absorption axis and a transmission axis which are orthogonal to each other,
wherein the first polarizing plate and the second polarizing plate are arranged to sandwich the liquid crystal panel.

7. The liquid crystal display device of claim 6, wherein the absorption axis of the second polarizing plate is orthogonal to the absorption axis of the first polarizing plate.

8. The liquid crystal display device of claim 6, further comprising an illuminating device placed opposite to the liquid crystal panel of the optical member to emit illuminating light toward the liquid crystal panel.

9. The liquid crystal display device of claim 6, wherein the liquid crystal panel is of a fringe field switching (FFS) type.

10. The optical member of claim 1 for use in a transmissive/reflective liquid crystal display device.

11. The optical member of claim 1, wherein the value k is 0.24 or more.

12. The optical member of claim 1, wherein the angle β is 0° or more and equal to or less than 15° with respect to the normal of the optical anisotropic diffusion layer.

* * * * *